United States Patent [19]

Tsuchitani et al.

[11] Patent Number: 5,417,312
[45] Date of Patent: May 23, 1995

[54] SEMICONDUCTOR ACCELERATION SENSOR AND VEHICLE CONTROL SYSTEM USING THE SAME

[75] Inventors: Shigeki Tsuchitani, Mito; Seiko Suzuki, Hitachioota; Tomoyuki Tanaka, Hitachi; Masayuki Miki, Katsuta; Masahiro Matsumoto, Hitachi; Norio Ichikawa, Mito; Hiromichi Ebine, Oomiya; Yukiko Sugisawa, Katsuta; Kanemasa Sato, Katsuta; Sadayasu Ueno, Katsuta; Yasuhiro Asano, Katsuta; Masanori Kubota, Nakaminato; Masayoshi Suzuki, Hitachioota, all of Japan

[73] Assignees: Hitachi, Ltd., Tokyo; Hitachi Automotive Engineering Co., Inc., Katsuta, both of Japan

[21] Appl. No.: 147,083

[22] Filed: Nov. 3, 1993

Related U.S. Application Data

[63] Continuation of Ser. No. 707,165, May 29, 1991, abandoned.

[30] Foreign Application Priority Data

| May 30, 1990 | [JP] | Japan | 2-138494 |
| Jun. 15, 1990 | [JP] | Japan | 2-155217 |
| Jun. 15, 1990 | [JP] | Japan | 2-155218 |
| Jun. 18, 1990 | [JP] | Japan | 2-157528 |

[51] Int. Cl.$^6$ .......... B60T 8/58; B60T 8/72; G01P 15/08
[52] U.S. Cl. .......... 188/181 A; 73/517 AV; 303/100
[58] Field of Search ......... 303/100, 105; 188/267, 188/290, 181 R, 181 A; 73/517 AV; 280/707

[56] References Cited

U.S. PATENT DOCUMENTS

| 4,574,327 | 3/1986 | Wilner | 361/283 |
| 4,638,669 | 3/1987 | Chou | 73/317 R |
| 4,850,656 | 7/1989 | Ise et al. | 303/100 X |
| 4,869,476 | 9/1989 | Shtarkman | 188/267 X |
| 4,896,752 | 1/1990 | Shtarkman | 188/267 X |
| 4,942,947 | 7/1990 | Shtarkman | 188/290 X |
| 5,095,752 | 3/1992 | Suzuki et al. | 73/517 R |
| 5,100,166 | 3/1992 | Mitsui | 280/707 |

FOREIGN PATENT DOCUMENTS

| 0338688 | 10/1989 | European Pat. Off. |
| 2637984 | 4/1990 | France . |
| 62-27666 | 2/1987 | Japan . |
| 64-25062 | 1/1989 | Japan . |
| 253657 | 10/1989 | Japan . |
| 2047902 | 12/1980 | United Kingdom . |

Primary Examiner—Robert J. Oberleitner
Assistant Examiner—Peter M. Poon
Attorney, Agent, or Firm—Ladas & Parry

[57] ABSTRACT

A semiconductor acceleration sensor is formed by a cantilever having a conductive movable electrode of predetermined mass at one end, at least one pair of fixed conductive electrodes which are stationary with respect to the movable electrode located on opposing sides of the movable electrode, and gaps provided between the movable electrode and the fixed electrodes. To prevent the movable electrode becoming fused to the contacted fixed electrode, in a first aspect of this invention, an insulating layer is provided between the movable electrode and fixed electrodes, the layer being either on the movable electrode or on the fixed electrodes and in a second aspect the movable electrode or, preferably, the fixed electrodes, are formed of a high melting point material. In such a second aspect, to improve adhesion between the high melting point material and a substrate to which the fixed electrodes are mounted, a lower melting point material is firstly coated on the substrates. A sensor detector unit processing circuit has the output characteristic of the circuit digitally adjusted by suitable switching of a plurality of resistors, and the sensor chip and the detector unit integrated circuit may be located on a common base and mounted in a hermetically sealed chamber to prevent adverse environmental effects affecting operation of the sensor and detector unit assembly. A gas having a dew point of −40° C. or lower is, advantageously, charged into the hermetically sealed chamber.

26 Claims, 17 Drawing Sheets

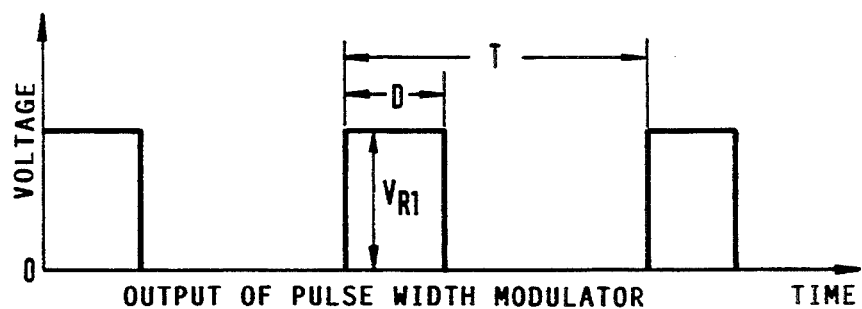
Fig.21(a) OUTPUT OF PULSE WIDTH MODULATOR
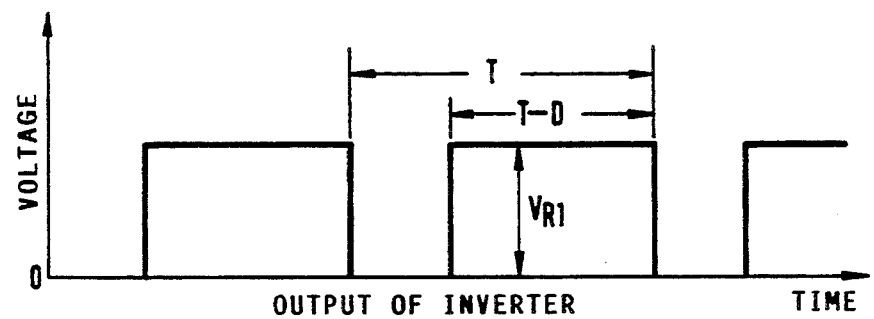
Fig.21(b) OUTPUT OF INVERTER
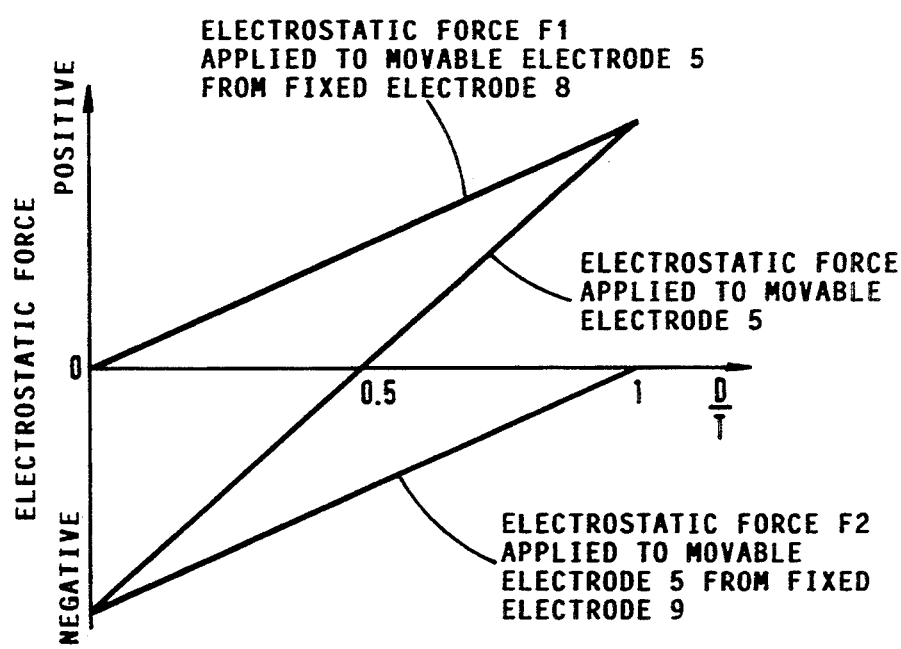
Fig.22

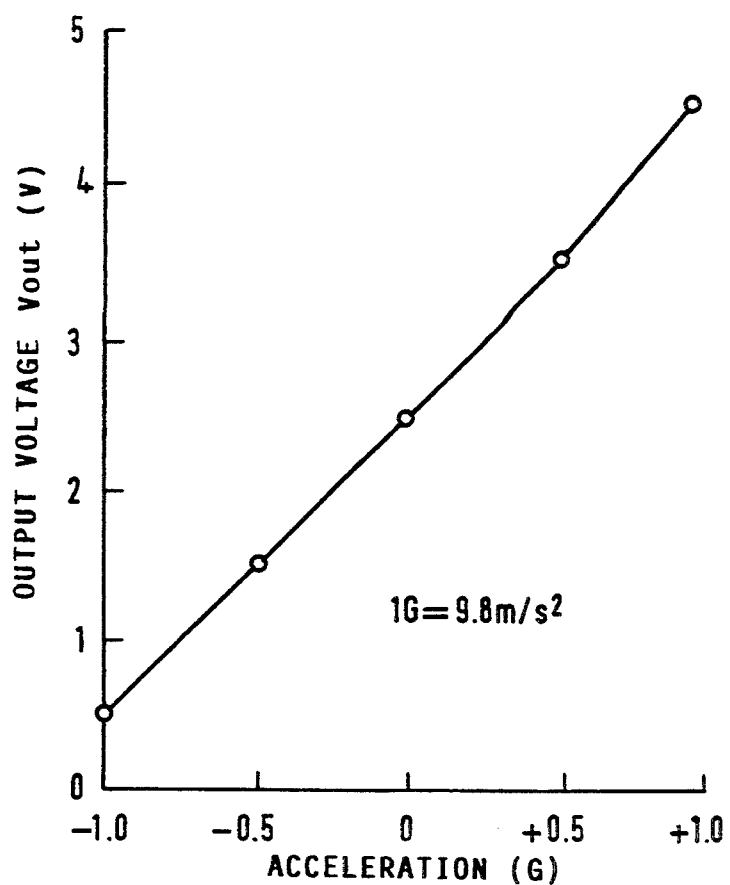
Fig.23
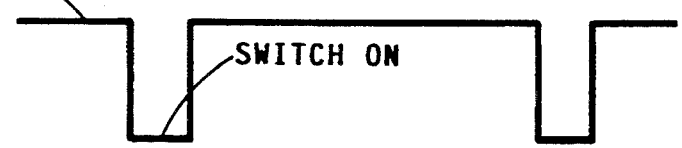
Fig.24(a) $\phi_S$
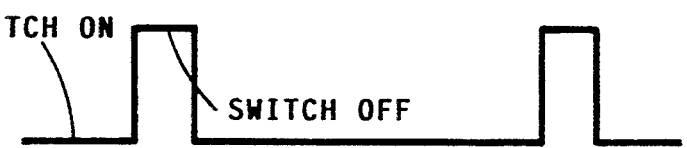
Fig.24(b) $\phi_R$
Fig.24(c) $V_2$  $V_{R1}$
Fig.24(d) $V_1$  $V_{R1}$
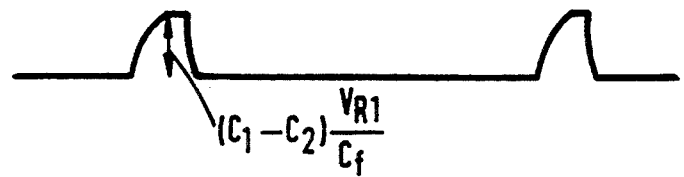
Fig.24(e) $V_C$
$(C_1-C_2)\dfrac{V_{R1}}{C_f}$

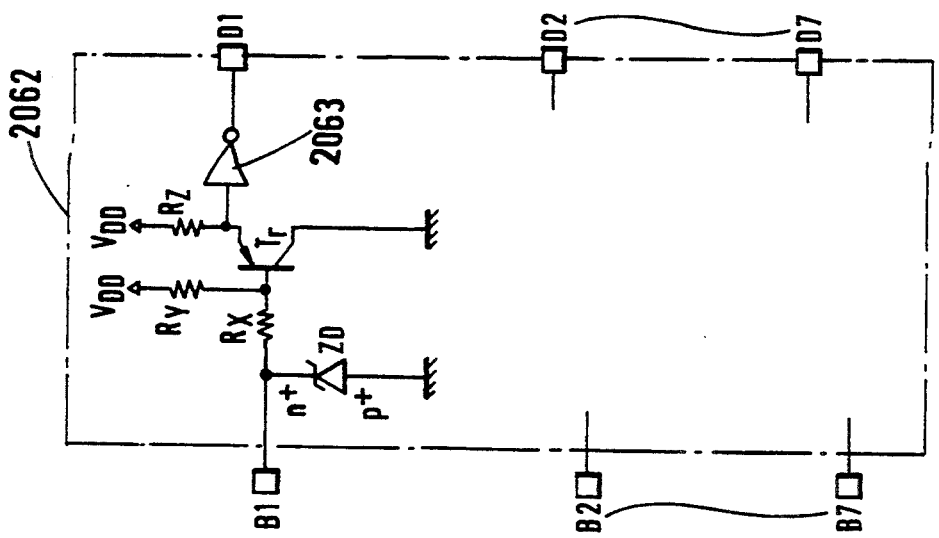
Fig. 26
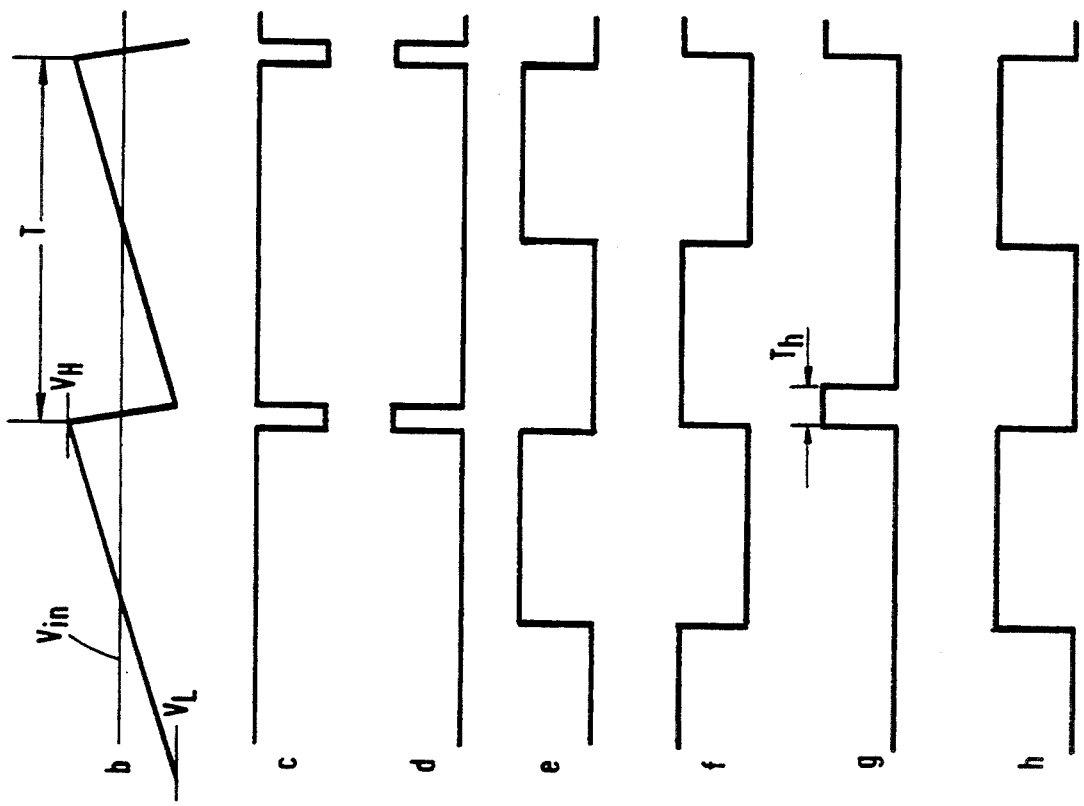
Fig.25(a)
Fig.25(b)
Fig.25(c)
Fig.25(d)
Fig.25(e)
Fig.25(f)
Fig.25(g)

SEMICONDUCTOR ACCELERATION SENSOR AND VEHICLE CONTROL SYSTEM USING THE SAME

This is a continuation of application Ser. No. 07/707,165 filed on May 29, 1991, now abandoned.

BACKGROUND OF THE INVENTION

1. Field of the Invention

This invention relates to a semiconductor acceleration sensor and to a vehicle control system using the semiconductor acceleration sensor.

2. Description of the Related Art

A known semiconductor acceleration sensor, particularly of a semiconductor electrostatic capacitance type and a semiconductor electrostatic servo type, is described in Japanese Patent Laid-Open No. 62-27666 (1987) and EP-A-0338688. In the reference a cantilever which forms an inertia body has a conductive movable electrode of predetermined mass at one end and the movable electrode is disposed between opposed fixed conductive electrodes which are stationary with respect to the movable electrode, there being a gap between the movable electrode and the fixed electrodes.

The inertia force on the movable electrode and the electrostatic force between the movable and fixed electrodes are arranged to balance one another and the position of the movable electrode is controlled to be at a fixed position independent of the acceleration by changing the electrostatic force. The electrostatic force required is dependent on the gap between the movable and fixed electrodes and decreases with increasing gap width.

In the prior art reference, the gap between the movable electrode and the fixed electrodes is required to be as wide as possible since, otherwise, there is the problem that during acceleration, or deceleration, the conductive surfaces of the movable electrode come into contact with the opposing electrode surface of the corresponding fixed electrode. As a result, due to current passing through the electrodes, a short circuit may occur resulting in a high current flowing through the small area of contact between the electrodes which, in turn, results in melting the conductive material of the electrodes and fusing the electrodes together. It will be realized that, once fused together, the sensor is useless.

Another difficulty is that the static charges that accumulate on a human body during the sensor manufacturing process may transfer to the sensor, generating a high voltage between the inertia body surface and the electrode surfaces. The force of electrostatic charge attracts the inertia body surface and the electrode surfaces to each other and may cause them to come into contact with each other. This in turn results in a short-circuit current flowing, fusing the movable electrode to one of the fixed electrodes. Such a fusing difficulty keeps the sensor yield at low levels and is a main factor contributing to the high cost of the sensor.

A possible countermeasure would be to increase the air gap between the inertia body and the stationary electrodes. However, such a step degrades the sensor's detection sensitivity and accuracy.

Another problem is that, without a desired damping, the inertia body will oscillate with large amplitudes at a resonance frequency. Such oscillation limits the measuring range of acceleration, making a highly precise measurement impossible.

An object of a first aspect of this invention is to provide a semiconductor acceleration sensor, for example of semiconductor electrostatic capacitance type or semiconductor electrostatic servo type, which can prevent malfunctions caused by the above-mentioned electrode fusing and which also has the ability to generate an oscillation damping force. An object of a feature of the first aspect of this invention is to realize a vehicle control system that can be incorporated into the small space available in vehicles and which can still measure and control the vehicle with high sensitivity and precision.

A second aspect of this invention will now be described relating to a further difficulty associated with the sensor described in the forementioned Japanese Patent Laid-Open No. 62-27666 (1987). In FIGS. 2 to 5 of the reference the chip structure of the acceleration sensor is shown. However, the reference does not refer to the reliability and cost of the heat resistance of the material used for the fixed electrodes, the adhesive strength between the fixed electrodes and substrates, the effects of the thickness of the upper and lower substrates on the characteristics, the shock resistance of the cantilever, and the management of the gaps between the movable electrode and fixed electrodes from the viewpoint of ease of assembly. In this respect, practical embodiments require consideration of the material used and structure of the sensor to achieve ease of assembly.

In the prior art reference measures for preventing thermal or electrical damage caused during the machining process of the detector have not been considered, imposing problems such as degradation of the fixed electrodes or of the substrate supporting the fixed electrodes. To assemble a silicon member forming the cantilever and movable electrode, and a borosilicate glass (for example, Pyrex ® glass #7740) substrate containing an alkaline component forming the fixed electrodes, and to produce gaps with a predetermined width between the fixed electrodes and the movable electrode, the said silicon member and said substrate are anodically bonded and laminated. In such assembly, the members are heated to a temperature between 300° C. and 400° C. at a high voltage ranging from 200 V to 1000 V, which causes degradation to the fixed electrodes or dielectric breakdown of the Pyrex ® glass. In this respect, small mounds appear in the electrode surface which are, typically, 3 $\mu$m or more in amplitude. Since the gap between the fixed electrode and movable electrodes is required to be only about 3 $\mu$m, the movable electrode can, therefore, not move, as required for inertia detection.

Furthermore, if there is a great difference in thickness between the upper and lower substrate supporting the fixed electrodes, the displacement caused by thermal deformation is different between the upper and lower substrates so that the electrostatic capacitance changes and the temperature characteristics thereof are worsened.

Also, if the ratio of the weight of the movable electrode to that of the cantilever is not appropriately defined, it is difficult to simultaneously satisfy both the detection accuracy and the shock resistance required of the sensor. The gap width between the movable electrode and each of the fixed electrodes will greatly affect the cost from the viewpoint of detection accuracy, machinability and assembly.

Accordingly, it is an object of a second aspect of this invention to at least partially mitigate the above enumerated problems.

It is known from "Silicon Microaccelerometer" transducers 1987 at pages 395 to 398 in the fourth International Conference on Solid-State Sensors and Actuators, June 1987, that an electrostatic servo circuit may be used for driving an electrostatic capacitor sensor. As also indicated in Japanese Patent Laid-Open No. 1-253657 (1989), a capacitance-type sensor using a pulse width modulation electrostatic servo circuit has been proposed.

It is generally known that a sensor varies in sensitivity and the zero point thereof depends on various factors during manufacture. Therefore, it is necessary to adjust the sensitivity at zero point in some manner. For example, the resistance may be changed by using a variable resistor or the printed resistor on an alumina substrate may be trimmed by using a laser, as is present day common practice, although the electronic parts and space required on the printed circuit board for such adjustment result in a larger and more expensive sensor.

It is an object of a second feature of this invention to provide a semiconductor acceleration sensor which is less expensive to produce and yet which is provided with an output adjustment circuit for accurately adjusting the sensitivity and zero point, and wherein a more compact electronic circuit is achieved than hitherto.

In Japanese Patent Laid-Open No. 64-25062 (1989) there is disclosed an acceleration detector formed by a magnet slidingly disposed in a housing, the magnet having spaced coils thereabout, whereby movement of the magnet by acceleration causes a differential induced EMF in the coils, and the unit is mounted on a printed circuit board with a control circuit therefor. In the prior art reference, however, no consideration is given to the reliability of the detector unit and control circuit against changes in environmental conditions, for example, temperature and humidity. Insufficient consideration has also been given to external radio frequency waves caused, for example, by the ignition device of the vehicle which tends to cause detector failures in the prior art device.

It is, accordingly, an object of a third feature of this invention to make a semiconductor acceleration sensor which is compact and light so that it can be mouted at any location in the body of an automobile, to ensure reliability such that the sensor can withstand changes in temperature, humidity and corrosive gases that exist in an engine compartment, and to ensure that the sensor is shielded from the effects of external radio waves.

SUMMARY OF THE INVENTION

According to a first aspect of this invention there is provided a semiconductor acceleration sensor comprising a cantilever having a conductive, movable electrode of predetermined mass at one end thereof, at least one pair of fixed conductive electrodes which are stationary with respect to said movable electrode and located on opposing sides of said movable electrode, said fixed electrodes being separated from said movable electrode by a predetermined gap, and characterized by insulation means located between the movable electrode and the fixed electrodes for preventing a short-circuit therebetween.

Preferably, insulation means is located on at least one of said movable electrode and the fixed electrodes.

In a first embodiment said insulation means is provided over the entire surface of at least one of said movable electrode and said fixed electrodes.

In a second embodiment said insulation means is provided on at least one of said movable electrode and said fixed electrodes only in the vicinity of initial contact between said movable electrode and said fixed electrodes.

In a third embodiment said movable electrode is a polygonal shape and said insulation means is provided on either said movable electrode apexes and the surrounding area thereof, or at the near corners only of said fixed electrodes.

In a fourth embodiment said insulation means is provided in a predetermined pattern on at least one of said movable electrode and said fixed electrodes, whereby said pattern provides a roughened surface on said electrodes to thereby entrap gas in areas not covered by said pattern of insulation means and to thereby provide a damping force to movement of said movable electrode, and in said fourth embodiment, conveniently, said predetermined pattern is either a pattern of stripes or a pattern of continuous strips.

In another embodiment said insulation means is provided on at least one of said movable electrode and said fixed electrodes only around a perimeter of said electrodes.

Conveniently, said insulating means is an electrical insulating layer formed of silicon oxide or silicon nitride.

Conveniently, said fixed electrode is formed of a metallic material having a surface adjacent said movable electrode formed by oxidation and said surface is coated with an electrical insulating material by sputtering or chemical vapor deposition.

Preferably, said gap is less than 10 $\mu$m.

Advantageously, said gap is 3 $\mu$m$\pm$1 $\mu$m.

Advantageously, said fixed pair of electrodes are formed on insulator plates or semiconductor plates or laminated plates consisting of an insulator layer and a semiconductor layer, whereby said plates sandwich the cantilever therebetween.

In an embodiment of a first feature of this invention there is provided a vehicle control system adapted to provide the function of at least one of an antiskid control equipment and a traction control equipment, comprising a semiconductor acceleration sensor for measuring forward and backward accelerations of said vehicle, said acceleration sensor having a cantilever having a conductive movable electrode of predetermined mass at one end thereof, at least one pair of fixed conductive electrodes which are stationary with respect to said movable electrode and located on opposing sides of said movable electrode, said fixed electrodes being separated from said movable electrode by a predetermined gap, and means located between the movable electrode and the fixed electrodes for preventing a short-circuit therebetween, wheel velocity sensors for measuring the velocity of the vehicle wheels, a control means for controlling a braking force, and means for determining the vehicle speed relative to the ground by using an output from the acceleration sensor.

In another embodiment of the first feature there is provided a vehicle control system for controlling vehicle suspension units fitted to each wheel of a vehicle comprising semiconductor acceleration sensors attached to predetermined locations in a body of said vehicle to measure a vertical acceleration of the vehicle body and also longitudinal and lateral accelerations caused by a rotary motion of the vehicle, said semiconductor acceleration sensors each comprising a cantilever for having a conductive movable electrode of predetermined mass at one end thereof, at least one pair of fixed conductive electrodes which are stationary with respect to said movable electrode and located on opposing sides of said movable electrode, said fixed electrodes being separated from said movable electrode by a predetermined gap, and means located between the movable electrode and the fixed electrodes for preventing a short-circuit therebetween, and a control means for determining a control quantity for each suspension unit by using the measured accelerations. Thus, to achieve the objectives of the first aspect of the invention, the conductive surface of the movable electrode and/or the conductive surfaces of the fixed electrodes are at least partially covered with a short circuit preventing means such as an electric insulating material.

According to a second aspect of this invention there is provided a semiconductor acceleration sensor comprising a cantilever having a conductive movable electrode of predetermined mass at one end thereof, at least one pair of fixed conductive electrodes which are stationary with respect to said movable electrode, said fixed electrodes being located on a substrate, said fixed conductive electrodes being separated from said movable electrode by a predetermined gap, at least one of said movable electrode and said fixed electrodes having a surface layer made of material having a melting point above 1300° C.

To achieve the objective of the second aspect of the invention, therefore, the movable and fixed electrodes have outer surface layers which are such that if the movable electrode should contact with a respective one of the fixed electrodes, the electrodes are not fused together. Such is achieved in the present invention by selecting the fixed electrodes to have a surface layer made of a material having a melting point above 1300° C.

Such high melting point materials for said layer may be selected from materials among Al, Al-Si, AE-Pd, Cr, Mo, Ni, Ti, W, Pd, Pt, Au, Ag-Cu, Ag-Cd, Ag-W, Ag-CdO, other A alloys containing oxides, WC, Pd-Cu, Au-Cu, Au-Ni and AuCO precipitation hardened alloys. So as to improve the film deposition strength to the substrate, preferably, said surface layer is located on each of said fixed electrodes and said surface layer is formed of at least two layers, a first layer directly in contact with said substrates supporting the respective fixed electrodes, said first layer having a melting point lower than that of a second, outer layer.

Advantageously, said first layer is formed of material among Al, Al-Si, Al-Pd and Cr, and said second layer is selected from among Mo, Ni, W, Ti, Pd and Pt.

In a currently preferred embodiment the metallic film thickness forming the first layer is in the range from 0.01 μm to 0.1 μm and the metallic film thickness forming the second layer is 0.1 μm or more.

Preferably, each fixed electrode is located on a separate substrate, each said substrate being formed of borosilicate glass containing an alkaline component and the thickness ratio between the upper and lower substrates ranging from 0.5 to 2.0. Because the semiconductor of the cantilever is sandwiched between glass substrates and silicon plate connected to the cantilever is bonded to the glass substrates by anodic bonding made at 300° C. to 400° C. with a high applied voltage ranging from 200 V to 1000 V, dielectric breakdown may be caused to the glass substrates and microcracks produced. To prevent such microcracks, the substrates have a thickness in the range from 0.2 mm to 1.5 mm. Furthermore, the thickness ratio between the upper and lower substrates which support the fixed electrodes is, preferably, two times or less so that changes in the electrostatic capacity caused by thermal deformation when the assembly is used within a wide temperature from, for example, −40° C. to +120° C. can be ignored.

Furthermore, through-holes for lead electrodes, which are taken out of the fixed electrodes, are provided in the substrate so as to allow efficient assembly, and silicone rubber is filled and hardened in the through-holes to prevent moisture, foreign substances, and dust from entering into the through-holes, a lead electrode is formed on the inner wall of each through-hole by sputtering or deposition. The material of such lead electrodes is normally the same as that used for the fixed electrodes. The substrate thickness is controlled to be preferably 0.2 mm to 1.5 mm, as aforesaid, in consideration of the adhesion of the lead electrode forming material to the inner wall of each through-hole and the cutting property of a dicer. Furthermore, the ratio of the weight of the movable electrode to that of the cantilever is controlled to be 100 to 250:1 so as to improve the shock resistance thereof without any degradation in detection accuracy in the event that the sensor should fall or be hit.

According to second feature of this invention there is provided a sensor in accordance with said first or said second aspect in combination with an accelerator detector unit said detector unit comprising a processing circuit for processing signals from the sensor wherein said processing circuit comprises a first capacitor and a first switching means as a feedback element of an operational amplifier, a negative input terminal of said operational amplifier being connected to said movable electrode and a positive input terminal of said operational amplifier being connected to a predetermined reference voltage, a sample hold circuit comprising a second switching means and a second capacitor for detecting electrostatic capacitance difference between the movable electrode and each of the fixed electrodes as a voltage at the output terminal of the operational amplifier, an amplification means for amplifying the output of the second switching means and second capacitor, means for generating a waveform train with a period the pulse width of which is modulated by the amplified signal, means for supplying the voltage waveform train to each said fixed electrode, means for turning the said first and second switching means ON or OFF for a predetermined period of time in synchronization with the voltage waveform train, means for converting the voltage waveform train to an analogue voltage, and an output adjustment means for adjusting the analogue voltage to a predetermined characteristic.

Advantageously, said processing circuit is arranged such that when said first switching means is OFF the second switching means is ON.

Conveniently, said voltage waveform train is applied to one of said fixed electrodes and the waveform train which reverses the voltage waveform train is applied to the other fixed electrode.

In a currently preferred embodiment said predetermined reference voltage is the same level as the peak value of said voltage waveform train.

By the second feature of this invention, the acceleration sensor has integration of the acceleration detection processing circuit including the output adjustment circuit for adjusting the sensitivity and zero point of the sensor by using a mixture of a bipolar device and a CMOS device (Bi-CMOS device) to provide a sensor which is lower in price and more compact than known sensors. For adjustment of the sensitivity and zero point, various resistances may be combined by combining some resistors and resistor switching means and turning some resistor switching means ON or OFF, for example under digital control, so as to contact the resistors in series or parallel, and the sensitivity at zero point can also be adjusted. Furthermore, since the resistor switching means can be digitally controlled, all of the combinations of the resistor switching means can be predeterminedly evaluated and variations in the resistance or in the operation amplifier or reference voltage circuit can be precalculated, thereby providing highly accurate sensitivity and zero point adjustment.

In a third feature of this invention there is provided a sensor as claimed in the first or second aspect in combination with a detector unit therefor, both located in a hermetically sealed chamber.

Advantageously, the detector unit is an integrated circuit and the sensor is an integrated chip device and said integrated circuit and said chip device are both mounted on a base, and a cap is hermetically sealed to said base.

Preferably, an inert gas having a dew point of −40° C. or less is charged into the hermetically sealed chamber.

Advantageously, signals to and from the sensor and detector unit are supplied via lead pins which are hermetically sealed by glass in the base and said lead pins extend through said base into a sealed volume, said sealed volume being formed by a molding to which the hermetically sealed chamber is attached and a cover plate.

Conveniently, output connectors are connected to said lead pins by metallic wires made from one of Ni, Al, or Au and said connector is adapted to provide external signals indicative of sensor output to control means.

Advantageously, through-type capacitors are incorporated in said lead pins for reducing broad band noise from the lead wires.

Furthermore, advantageously, the integrated circuit and said chip device are mounted on a thick film alumina substrate adapted to provide a ground pattern whereby effect of external radio waves and noise is minimized.

To further reduce noise, advantageously, the distance between the integrated circuit and the chip device is 1 mm or less.

To reduce warping, advantageously, the detector unit integrated circuit is secured to the base via a bonding layer which is 0.1 mm or less in thickness and said bonding layer may be made of silicone resin.

The provision of the third feature of this invention in which the sensor integrated circuit and acceleration detector unit are both contained in a hermatically sealed chamber provides a structure which is substantially immune from temperature, humidity, corrosive gases and external radio waves encountered in an automobile engine compartment.

BRIEF DESCRIPTION OF THE DRAWINGS

The invention will now be described, by way of example, with reference to the accompanying drawings in which:

FIGS. 21(a) and (b) show output waveforms of a pulse width modulator and an inverter respectively;

FIG. 22 shows a graph of the relationship between the duty cycle of a voltage waveform applied to a fixed electrode and the electrostatic force acting on the movable electrode;

FIG. 23 shows an output characteristic diagram of the acceleration sensor of the present invention;

FIGS. 24(a)–(e) show operational waveforms of a capacitance detector unit;

FIGS. 25(a)–(g) show operational waveforms of the pulse width modulator at varying positions of the circuit shown in FIG. 20;

FIG. 26 shows a circuit diagram of a switch control means;

In the Figures like reference numerals denote like parts.

DESCRIPTION OF PREFERRED EMBODIMENTS

Figure 1:
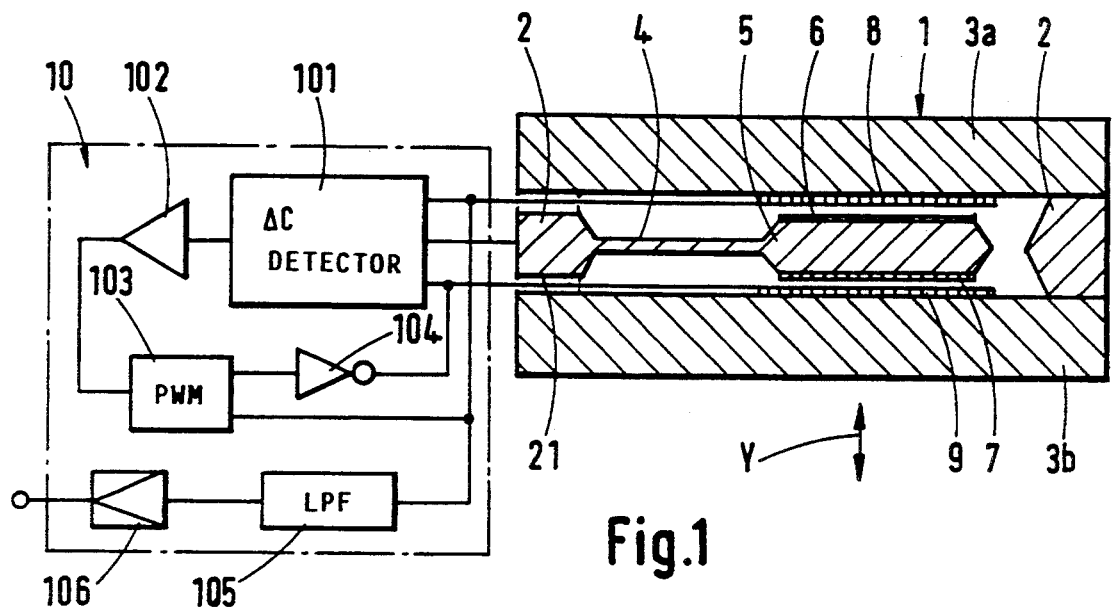
FIG. 1 shows a longitudinal cross-sectional side view of of one embodiment of a sensor in accordance with a first aspect of this invention, in which an electric insulation layer is provided on the surfaces of the movable electrode adjacent the fixed electrodes, and in which the sensor is in combination with a detector unit to thereby form a sensor assembly.

The semiconductor acceleration sensor assembly shown in FIG. 1 has a semiconductor acceleration sensor 1 in accordance with the first aspect of this invention and a detector unit 10 control circuit for the sensor, the sensor being used as an electrostatic servo type acceleration sensor.

The sensor has a laminated structure consisting of a semiconductor silicon plate 2 interposed between two insulating plates 3a and 3b, made, for example from glass. The semiconductor silicon plate 2 is treated by anisotropic etching to form a cantilever 4 and an inertia body, that is movable electrode 5, and channels 21 through which connecting wires may pass to the detector unit 10. Thus, the cantilever 4 and movable electrode 5 are formed from the silicon plate 2 and the cantilever joins the movable electrode to the silicon plate. The inertia body 5 functions as an electrode and has electric insulating layers 6, 7 of, for example, 1 μm or less formed on opposing (top and bottom) surfaces thereof. The electric insulating layers 6, 7 are formed of a material such as silicon oxide or silicon nitride.

Figure 20:
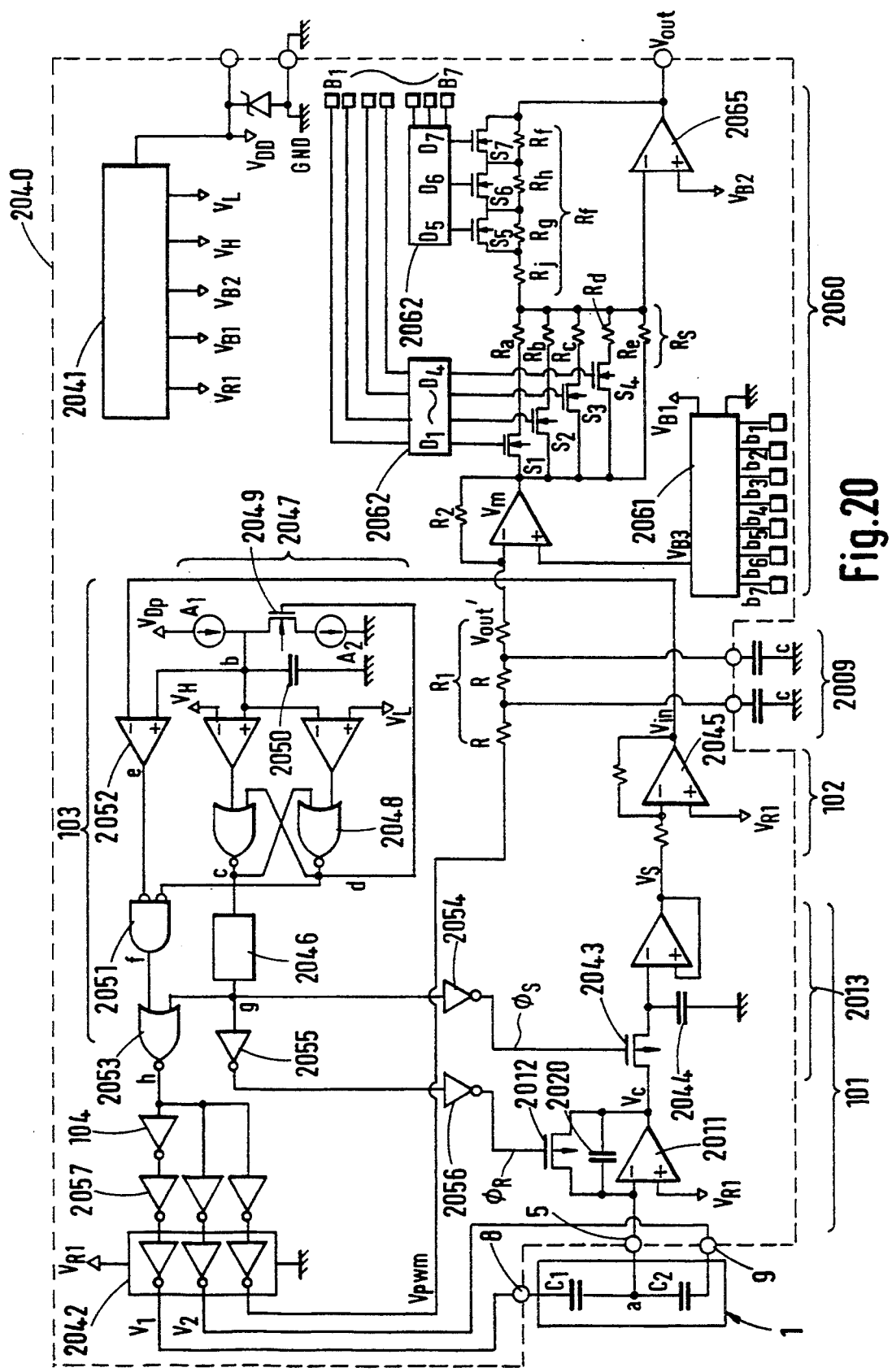
FIG. 20 shows a circuit diagram of the sensor of this invention in combination with a detailed diagram of an acceleration detector in accordance with the second feature of this invention.

The insulating plates 3a, 3b have thin film electrodes, that is stationary electrodes 8, 9 respectively, of a metallic conductor formed thereon at areas opposing the movable electrode 5. There are small air gaps of, for example, 10 μm or less, preferably 3 μm±1 μm between the movable electrode 5 and the upper and lower electrodes 8, 9. The movable electrode 5 and the upper electrode 8 form a capacitor C1, and the movable electrode 5 and the lower electrode 9 form a capacitor C2 (as shown in FIG. 20).

Figure 2:
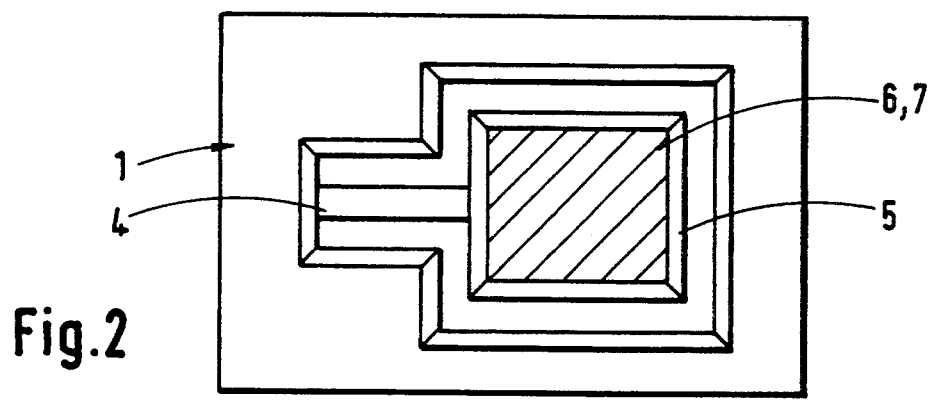
FIGS. 2 to 6 are plan views each respectively showing a different pattern of the electric insulation layer provided to the surface of the movable electrode.

In the plan view (FIG. 2) of the semiconductor silicon plate 2, the movable electrode 5 has its entire upper and lower surfaces covered with the electric insulating layers 6, 7. The provision of insulating layers 6, 7 has been found to give insulation between touching electrodes of up to 100 V.

When an acceleration is applied to the sensor 1 in the direction of double arrow-headed line Y, the inertia is exerted upon the inertia body formed by movable electrode 5 thereby deflecting the cantilever 4, so that the movable electrode 5 is displaced in a direction opposite to that in which the acceleration acts on the sensor. As a result, the air gaps between the movable electrode 5 and the electrodes 8, 9 change, which in turn changes the electrostatic capacitance of the capacitors C1 and C2 formed by the upper 8 and lower 9 electrodes and the inertia body 5.

The electrostatic capacitance can be calculated from the general expression:

$$C = \epsilon S/d$$

where $\epsilon$ is the dielectric constant of a substance or vacuum present between the electrodes; S is the area of electrode; and d is the size of the air gap.

The electrostatic capacitance type acceleration sensor utilizes the dependence of electrostatic capacitance on acceleration in determining the acceleration by an acceleration detector unit 10. In the electrostatic servo type acceleration sensor of FIG. 1, a detector 101 of the acceleration detector unit 10 measures the difference $\Delta C$ between electrostatic capacitances $C_1$ and $C_2$ of the two capacitors formed by the upper and lower electrodes and the moving electrode. The difference of the two electrostatic capacitances $\Delta C$ is then amplified by an amplifier 102 and a pulse width modulator 103 is controlled in such a way as to make this amplified signal become zero independent of the acceleration acting on the sensor. That is, with the output voltage of the pulse width modulator 103 applied to the upper electrode 8 and with a voltage converted from the pulse width modulator output voltage by a converter 104 applied to the lower electrode 9, the pulse width of the pulse width modulator 103 is controlled in such a manner that the electrostatic forces exerted between the movable electrode 5 and the upper and lower electrodes 8, 9 will try and maintain the displacement of the movable electrode 5 constant even when acceleration or deceleration occurs. The output signal of the pulse width modulator 103 is passed through a low-pass filter 105 to an amplifier 106 to determine the acceleration or deceleration by the width of pulses from the pulse width modulator.

The equation of force balance between the inertia force on the movable electrode and the electrostatic foces is given as follows:

$$mG = \frac{\epsilon S V^2}{2d^2} \cdot D - \frac{\epsilon S V^2}{2d^2} \cdot (1-D)$$

where mG is the inertia force, $$\frac{\epsilon S V^2}{2d^2} \cdot D$$

is the electrostatic force between the movable and upper fixed electrode, and $$\frac{\epsilon S V^2}{2d^2} \cdot (1-D)$$

is the electrostatic force between the movable electrode and the lower fixed electrode, where
V = applied voltage, D=duty ratio of applied signal to upper fixed electrode and movable electrode, m=mass of the movable electrode, G=acceleration applied to the detector, $\epsilon$=dielectric constant of medium between the fixed electrodes and movable electrode, S=operational surface area of the electrodes.

The above equation, thus, provides the relation between the acceleration G and the duty ratio D.

With this embodiment, since both the upper and lower surfaces of the inertia body 5 are completely covered with the electric insulating layers, no current flows between the movable electrode 5 and the upper and lower electrodes 8, 9 if they should make close contact with each other for some reason during operation, so that the movable electrode 5 can be prevented from fusing with the upper or lower electrode 8, 9.

Where the electric insulating layers provided to the entire surfaces of the movable electrode 5 or those of the upper and lower electrodes 8, 9 are very flat and smooth like a mirror, as in the above embodiment, there is the possibility of the movable electrode 5 becoming stuck to the upper or lower electrode 8 or 9 causing a malfunction of the sensor. Such a situation is created by the opposing surfaces contacting each other and thereby expelling the gas normally present between the opposed surfaces to thereby develop a negative pressure whereby the movable electrode becomes stuck to the associated fixed electrode. To avoid such a phenomenon, the area of the electric insulating layer should be made as small as possible.

Figure 3:
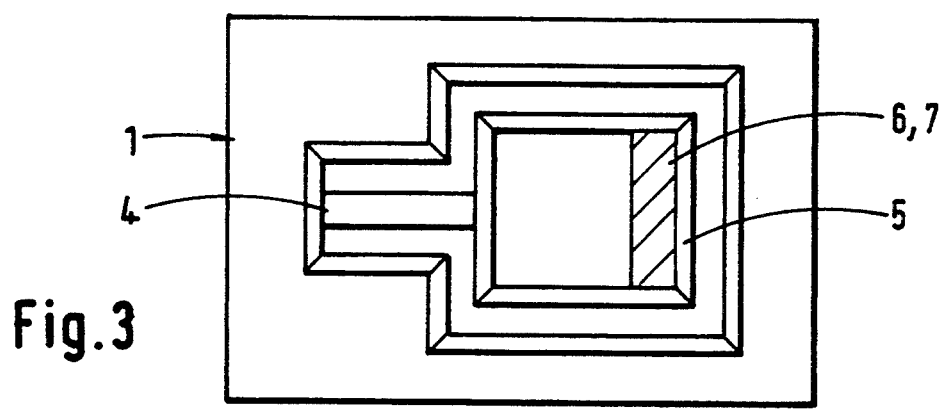

FIG. 3 shows a second embodiment of the movable electrode 5, in which electric insulating layers 6, 7 are provided only at the area in the vicinity where the movable electrode is most likely to contact the upper or lower electrodes 8, 9.

As shown in the FIG. 3, the areas of the movable electrode 5 surface that first contact the upper and lower electrodes 8, 9 are those remote from the cantilever 4. Hence, the provision of the insulating layers 6, 7 to these areas offers a good insulating effect when the displacement of the inertia body is not too great.

Figure 4:
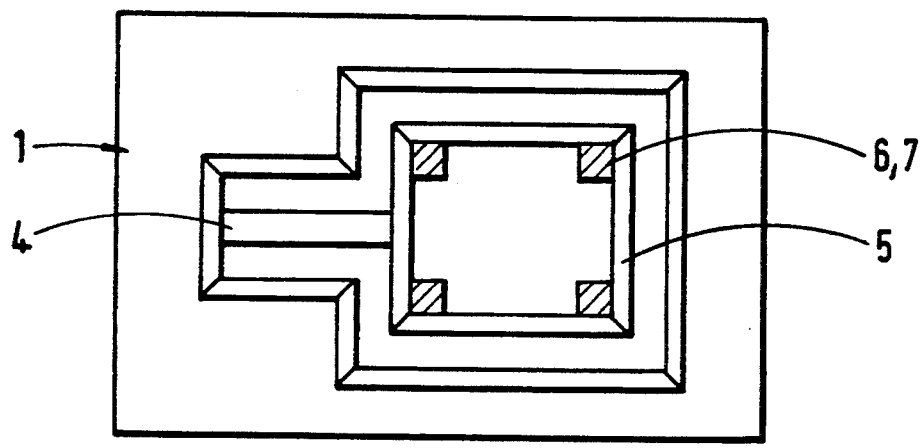

FIG. 4 shows a third embodiment of the movable electrode used in this invention.

The surface structure of the movable electrode 5 is generally a polygon, since it is formed by etching the silicon plate. FIG. 4 shows an example in which the electric insulating layers 6, 7 are provided at the apexes and the surrounding area thereof. In this case, when the movable electrode 5 is strongly urged against the upper and lower electrodes 8, 9, the conductive portion of the inertia body surface, again, does not contact the electrodes.

If one or more locations in the inner portion of the polygon surfaces are provided with small regions of electric insulating layer, the insulation effect can be retained even when the inertia body is deflected by a large force.

A damping force proportional in amplitude to the velocity of the inertia body motion—a force that mechanically hinders the displacement of the inertia body—has an important role in the operation of the acceleration sensor.

In a mechanical system like the acceleration sensor of this invention, there is a resonance frequency that is determined by the mass of the inertia body and the spring constant of the cantilever. When a damping force greater than a predetermined value is exerted upon the inertia body, the oscillating amplitude of the inertia body does not increase even when an external force of the same frequency as the resonance frequency is applied to the inertia body, because of the offsetting action of the damping force. As a result, the precision of measuring the acceleration is improved.

The action of the damping force ensures the stable operation of the servo system in the electrostatic servo-type acceleration sensor.

In an acceleration sensor constructed as shown in FIG. 1, a large damping force can be produced by forming a small gap between the movable electrode and the upper and lower stationary (fixed) electrodes and filling an inert gas, for example, nitrogen, therein at a pressure of 1 atmosphere.

The magnitude of the damping force can be controlled by adjusting the size of the gap. It is noted that the size of the gap has an influence on the electrostatic capacitances between the movable electrode and the upper and lower stationary electrodes and also on the electrostatic force in the electrostatic servo-type accceleration sensor. While it is desired from the characteristic point of view that the gap, for example an air gap, be made as small as possible, there is a limiting factor in what can be readily manufactured. The magnitude of the damping force changes not only with the size of the air gap but also with the roughness of the surface that defines the air gap. The coarser the surface, the greater the damping force will be. Thus, by changing the pattern of the insulating layer on the inertia body or on the surfaces of the upper and lower stationary electrodes, it is possible to adjust the roughness of the facing surfaces to produce an optimum damping force.

Figure 5:
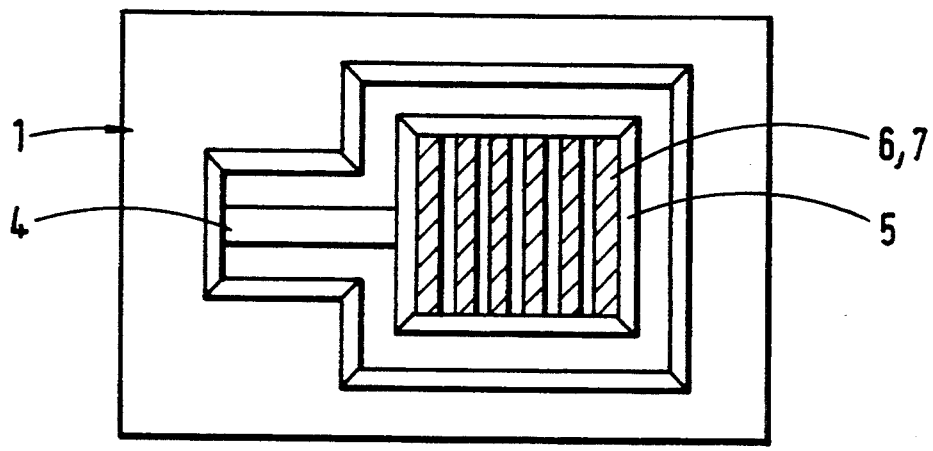

FIG. 5 shows a fourth embodiment of the movable electrode used in this invention, in which the electrical insulating layer is so arranged as to increase the damping force. In FIG. 5, a plurality of narrow strips of insulating layer are formed over the surface of the movable electrode. An adjustment is made of the width and the number of the insulating layer strips to have a desired damping force. Instead of strips as shown in the FIG. 5, the insulation layer may be formed into a grid or radial pattern to produce a similar effect.

Figure 6:
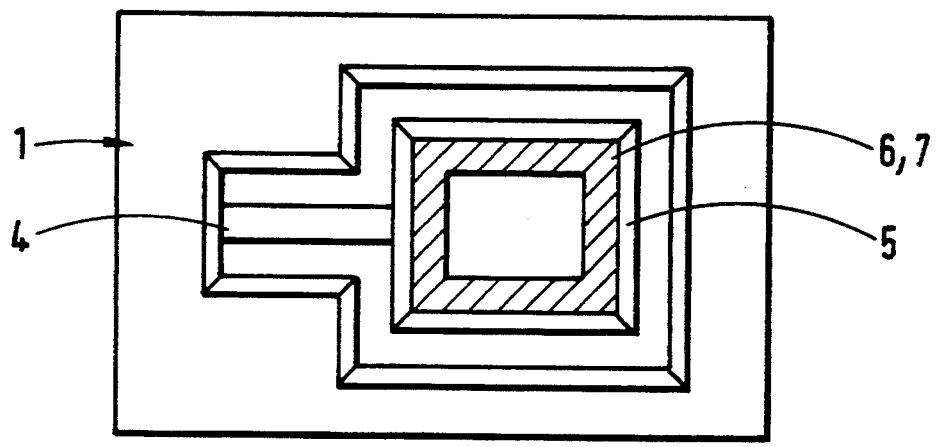

FIG. 6 shows a fifth embodiment of the movable electrode used in this invention. The periphery of the movable electrode surface is provided with a peripheral strip of an electrical insulating layer. This construction also increases the damping force as follows. When the size of the gap changes, the peripheral frame of the insulating layer strip helps prevent the gas contained in the gap between the movable electrode and fixed electrodes from escaping, thereby increasing the damping. An alternative pattern may be of concentric strips formed over the surface of the movable electrode.

As mentioned above, the fourth and fifth embodiments and similar patterns of insulating layer have the advantage of being able not only to prevent fusing but also to control the magnitude of the damping force of the inertia body.

While the preceding five embodiments have an electric insulation layer on the inertia body, it is also, alternatively, possible to provide the electric insulation layer to the surfaces of the upper and lower stationary (fixed) electrodes on the insulating plates for the purpose of preventing fusing.

Figure 7:
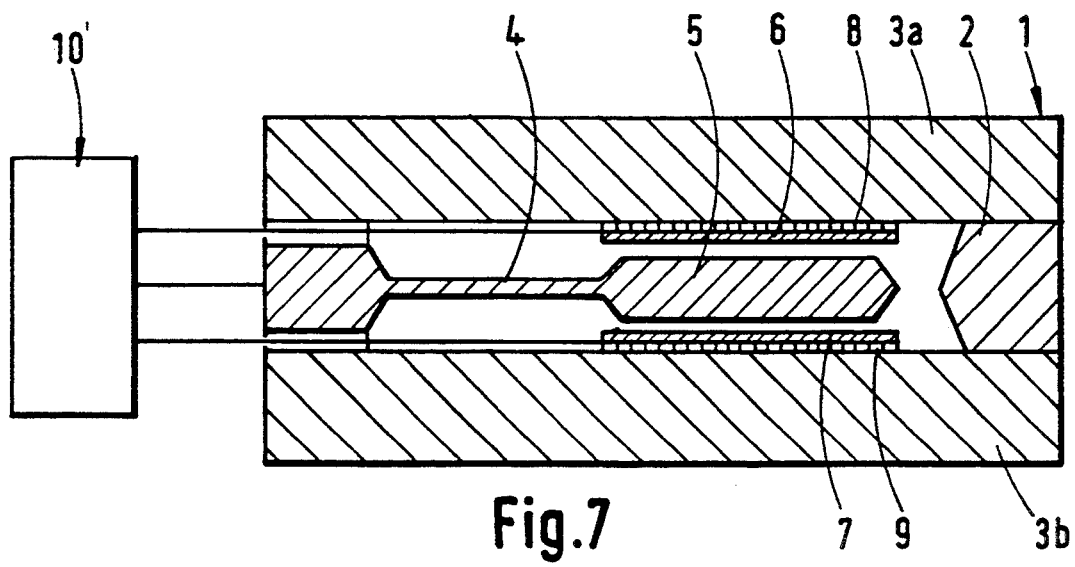
FIG. 7 shows a longitudinal cross-sectional side view of a sensor in accordance with another embodiment of the first aspect of this invention, in which an electric insulation layer is provided to the surfaces of the electrodes.
Figure 8:
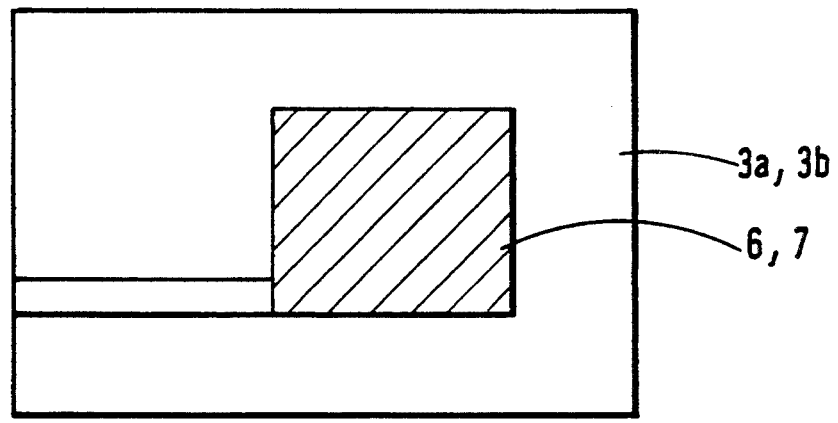
FIGS. 8 to 12 are plan views each respectively showing a different pattern of the electric insulation layer provided to the surfaces of the fixed electrodes.
Figure 9:
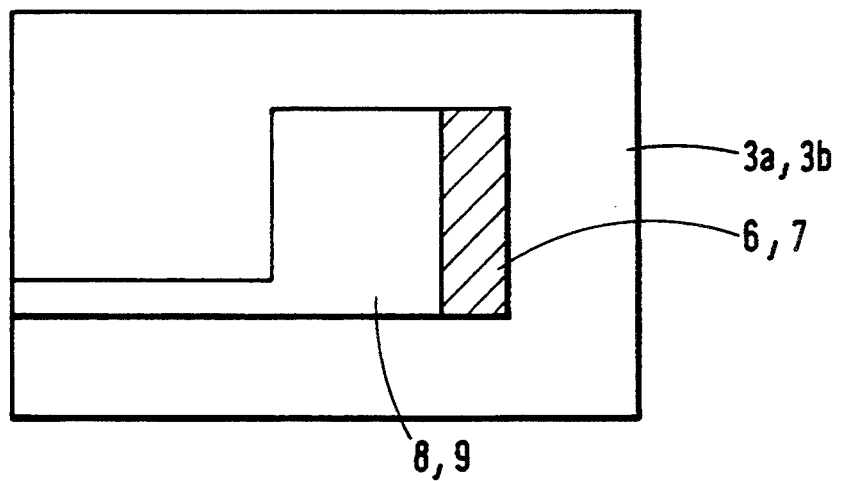
Figure 10:
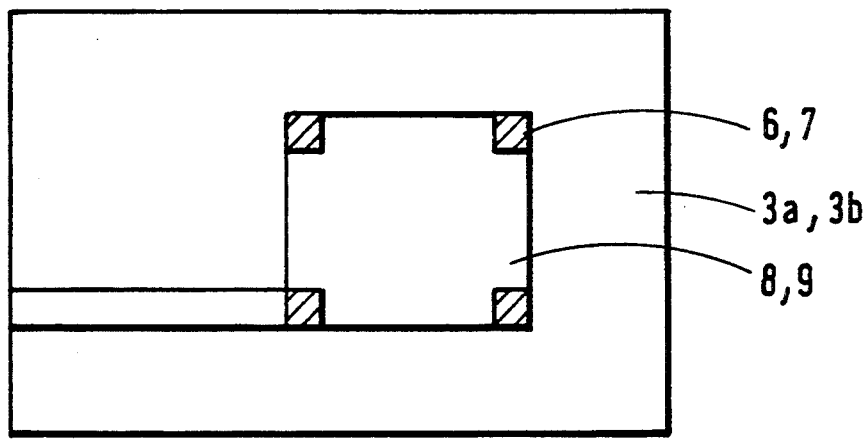
Figure 11:
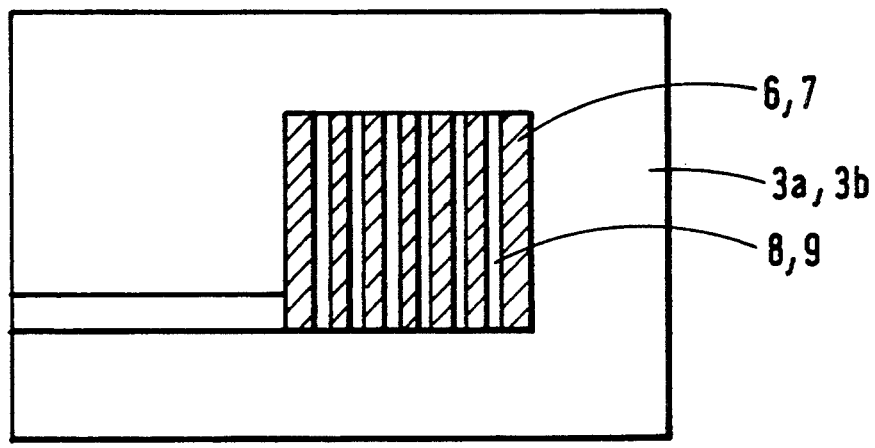
Figure 12:
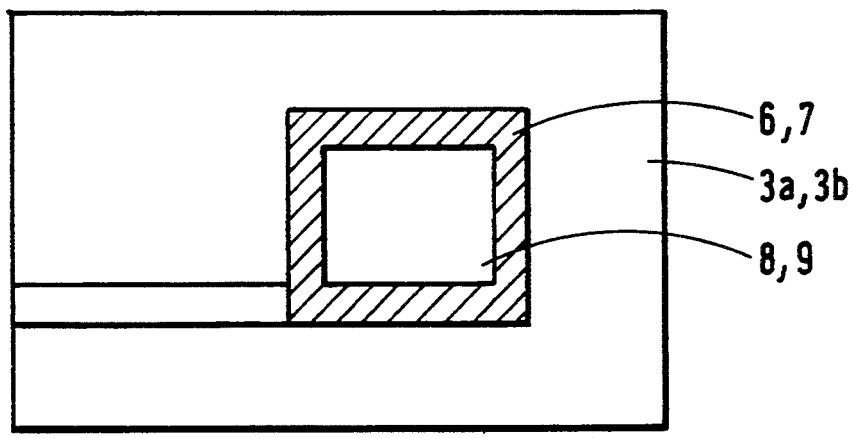

FIG. 7 shows a longitudinal cross-section of the sensor in which the electric insulation layer is provided to the entire surfaces of the stationary electrodes.

FIGS. 8 through 12 show the insulating layer patterns over the stationary electrodes 6, 7 in corresponding fashion to the insulating patterns on the movable electrode of FIGS. 2 to 6.

When the stationary electrodes 8, 9 are formed of metallic material, an electrical insulating layer of oxide can be readily produced over surfaces of the electrodes through thermal oxidation in an oxygen atmosphere or through anode oxidation, a kind of electrochemical reaction.

It is also possible to deposit the insulating material on the electrodes by sputtering or chemical vapor deposition.

In all the foregoing embodiments, the surface of the conductor is provided with an electrical insulating layer. However, as an alternative, the surface of the inertia body or of the stationary electrodes may be formed of a material that does not easily fuse, as will be described later herein. In this respect, the fusing is known as one of the causes for contact failure and research has been conducted to develop various materials that are not easily fused. The materials that may be used for forming the surfaces of the inertia body or of the stationary electrodes in the semiconductor sensor include: Pt alloys, Ag-Cu, Ag-Cd, Ag-Pd, Ag-W, Ag-CdO, other Ag alloys containing oxides or WC, Pd-Cu and Au-Cu regular grid alloys, and Au-Ni and Au-CO precipitation hardened alloys.

The number of cantilevers used in the invention is not limited to only one as in the above embodiments. Instead of using the upper and lower insulating plates, it is possible to attach to the silicon plate 2 separate silicon plates that are electrically insulated from the center silicon plate 2. In such a case, since the silicon plates themselves are conductors, there is no need to form electrodes. To prevent fusing, an electrical insulating layer is then provided between the inertia body (movable electrode) and the upper and lower silicon plates. The upper and lower silicon plates and the center silicon plate may be formed in the same shape as the electrical insulating layer.

Further, the upper and lower plates attached to the center silicon plate 2 may be formed as a laminated body of silicon and glass layers. In this case, a glass layer is used as a bonding layer between the plates and the center silicon plate 2. The stationary electrodes may then be formed of a thin film of metallic conductor.

Next will be described exemplary control systems that employ a semiconductor acceleration sensor of the first aspect of this invention, or of the second aspect of this invention described hereinafter.

An antiskid braking system is a system that controls the braking force in such a way as to make the slip rate of the wheels equal to an appropriate predetermined value whenever a driver depresses the brake pedal, so that the stability of the vehicle can be maintained while at the same time producing a large braking force.

Figure 13:
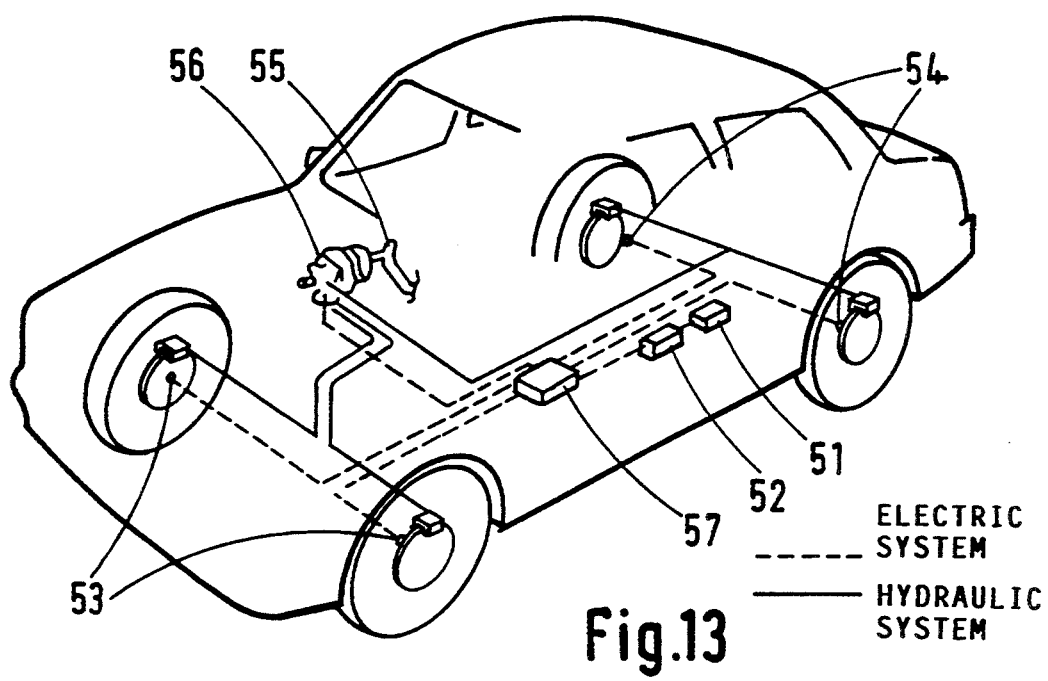
FIG. 13 shows a schematic diagram of an embodiment of a vehicle control system in accordance with the first feature of this invention which the semiconductor acceleration sensor of the first aspect is used.

In FIG. 13, a semiconductor acceleration sensor 51 which may be in accordance with the first aspect of this invention described above or the second aspect of the invention described hereinafter is mounted so as to be able to detect the acceleration of the car body in the forward and backward directions. An acceleration detecting circuit 52 and wheel velocity sensors 53, 54 that determine the car speed from the wheel revolutions or wheel speed are connected to a control circuit 57. A brake pedal 55 is connected with a hydraulic unit 56 having a built-in master cylinder.

The slip rate S of the wheels is defined by $$S = (V_r - V_w)/V_r \quad (1)$$

where $V_r$ is a real speed relative to the road, that is, the vehicle speed to the road; $V_w$ is a vehicle speed calculated from the wheel velocity sensors. The vehicle speed $V_w$ is equal to the vehicle speed to the road $V_r$ when there is no slip, and is smaller than $V_r$ when the wheels skid during braking.

As mentioned above, the antiskid braking system automatically controls the braking force so that the slip rate will assume the predetermined optimum value. To calculate the slip rate requires measuring the vehicle speed relative to the road. The system shown in FIG. 13 uses signals from the semiconductor acceleration sensor to calculate the vehicle speed relative to the ground from the following equation.

$$v(t) = V(0) + \int a(t)dt \quad (2)$$

That is, the vehicle speed is calculated from the initial velocity value V(0) and the acceleration $a(t)$ integrated over a specified time. When no slip occurs, the wheel speed equals the vehicle speed relative to the ground. Hence, the wheel speed immediately before the driver starts applying the brake, for example, is taken to be the initial velocity V(0). In FIG. 13, electric signals from the acceleration detecting circuit 52, wheel speed sensors 53, 54 and hydraulic unit 56 are sent to the control circuit 57, which calculates the skid rate and controls the braking force through the hydraulic system.

A traction control system controls the skid rate at time of initial motion so as to produce a large traction force. Such a system also requires a sensor to determine the vehicle velocity relative to ground and can be calculated by using the above-mentioned semiconductor acceleration sensor based on the equation (2).

Another representative vehicle body control system using a small, high precision acceleration sensor includes an active suspension system.

A hydraulic active suspension, which actively controls the vertical oscillation and attitude of the vehicle body by use of hydraulic force, is provided to each of the four wheels and changes the hydraulic actuator force according to the unevenness of the road and the vehicle running condition to minimize the vibrations and attitude changes of the car body, thereby assuring both good ride comfort and stable drivability.

Figure 14:
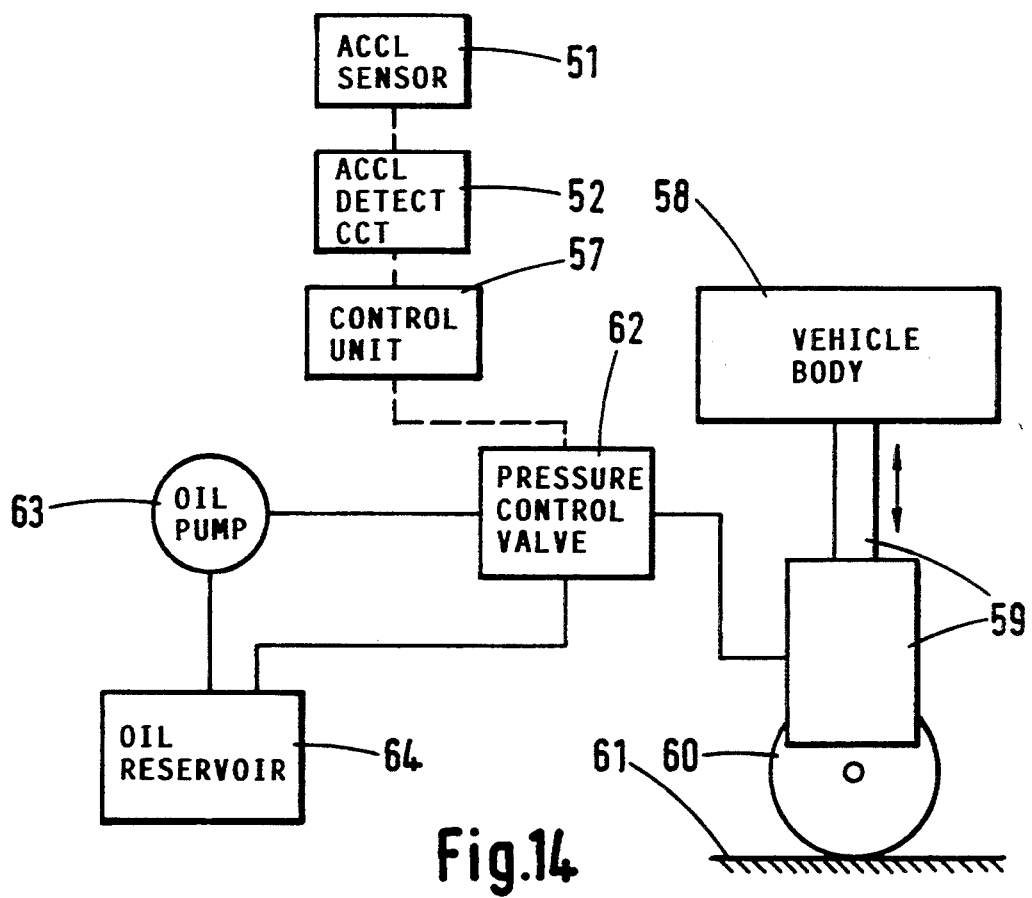
FIG. 14 shows a schematic diagram of another embodiment of a hydraulic active suspension control system in accordance with the first feature of this invention in which the semiconductor acceleration sensor of the first aspect is used.

FIG. 14 shows a diagram of a hydraulic active suspension system using the semiconductor acceleration sensor. A hydraulic actuator 59 is fitted to each of the four wheels 60 on a surface 61. The hydraulic actuator 59 comprises a piston and a cylinder, with the cylinder secured to the car body 58 and the piston to the wheel 60.

The semiconductor acceleration sensor 51 and the acceleration detecting circuit 52 detect longitudinal and lateral accelerations caused by rotary motion as well as a vertical acceleration and feeds them to the control circuit 57.

A pressure control valve 62, oil pump 63, and oil reservoir 64 provide hydraulic fluid to actuate the actuator 59. A control signal from the control circuit 57 changes the pressure control valve state to control the hydraulic pressure to the hydraulic actuator 59.

Highly precise detection of vertical vibrations and attitude of the car body by the acceleration sensor and also the active control of the suspensions using measurements from the acceleration sensor of this invention offer substantial improvements in both ride comfort and drivability.

As far as car body control is concerned, applications for the present sensor also include engine overall control, transmission control, and four-wheel drive control systems.

In other than vehicle control systems, the sensor of this invention can be used on an air bag system related to passengers' safety.

In fields other than the automotive industry, the present acceleration sensor can be used for controlling electric trains and improving ride comfort of elevators and also as an acceleration and vibration detecting sensor for space equipment, robots and home electric appliances.

In the first aspect of this invention there is provided a sensor that prevents fusing between the inertia body and the stationary electrodes in the sensor during operation or during handling in the manufacturing process and which detects acceleration with high reliability and accuracy. The use of the sensor can provide a vehicle control system that offers a responsive, stable control.

A semiconductor acceleration sensor of the second aspect of this invention and a detector unit 10 therefor will now be described with reference to FIG. 15. The sensor assembly of FIG. 15 is similar to that shown in FIG. 1 except for the omission of the insulation layers 6, 7 and the replacement of the metal conductors 8, 9 by metal conductors 8', 9' of special type.

Figure 15:
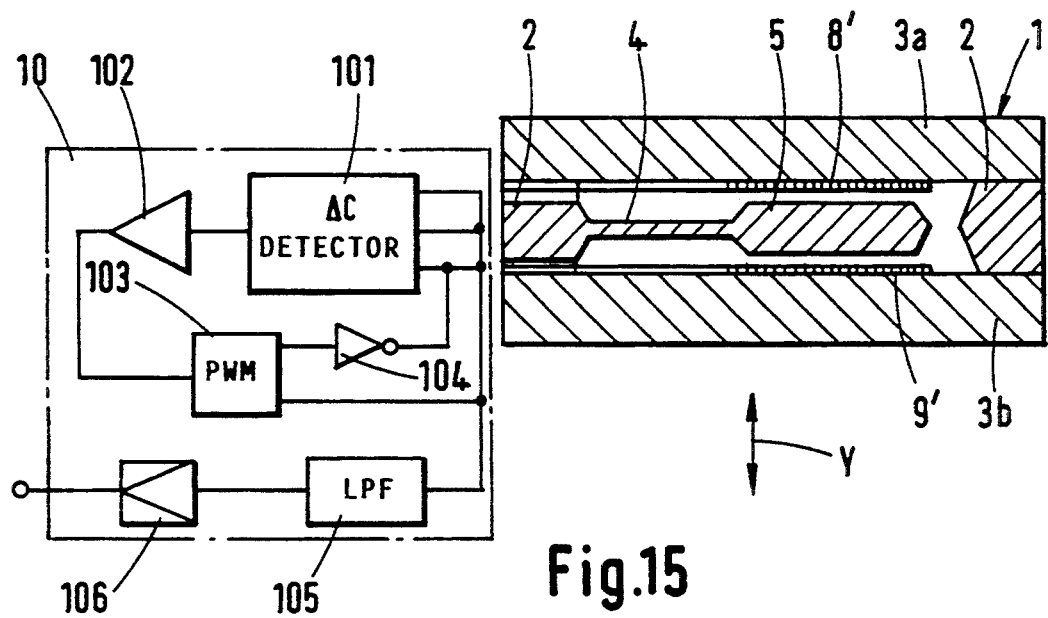
FIG. 15 shows a longitudinal cross-sectional side view of a sensor in accordance with a second aspect of this invention in combination with a detector unit simplified circuit.

Thus, in FIG. 15, the sensor 1 is formed of a laminate of the semiconductor silicon substrate 2 and two insulating substrates 3a, 3b advantageously having a similar coefficient of expansion as silicon. On the semiconductor silicon substrate 2, the cantilever 4 and the inertia body (forming a movable electrode) 5 are formed by anisotropic etching.

In the areas of the insulating substrates 2, 3 (for example, borosilicate glass such as Pyrex ® glass #7740 containing an alkaline component such as $K_2O$ or $Na_2O$) which oppose the inertia body 5, thin film electrodes (fixed electrodes) 8' and 9' are formed, which are metallic conductors. Micro gaps of $3\mu \pm 1$ μm are provided between the inertia body 5 and the upper and lower electrodes 8' and 9'. The movable electrode of the inertia body 5 and the upper electrode 8' form a pair of plates of a capacitor C1, and the movable electrode of the inertia body 5 and the lower electrode 9' form another pair of plates of another capacitor C2.

Figure 16A:
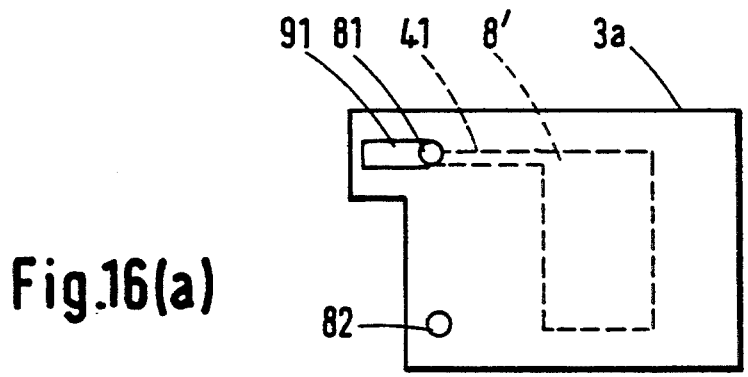
FIG. 16(a)–(c) show plan views of an upper substrate of the semiconductor acceleration sensor in accordance with the second aspect of this invention, a silicon substrate forming a movable electrode (an inertia body) comprising a cantilever of the movable electrode, and a lower substrate respectively.
Figure 16B:
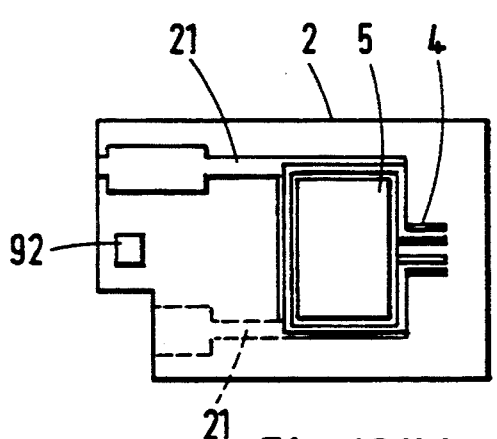
Figure 16C:
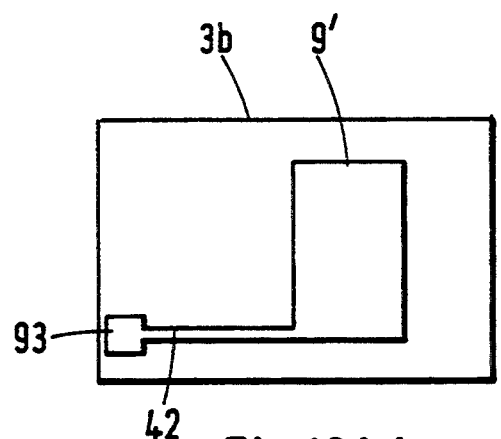

FIG. 16(a) is a plan view of the insulating substrate 3a which forms the upper fixed electrode 8' FIG. 16(b) is a plan view of the semiconductor silicon substrate 2, and FIG. 16(c) is a plan view of the insulating substrate 3b which forms the lower fixed electrode 9'. Through-holes 81 and 82 are provided in the upper substrate 3a and the electrodes 8', 9' are connected by wires 41, 42 to wire bonding pads 91 and 93 for connecting to the external circuit as is a pad 92 of FIG. 16(b).

Figure 17:
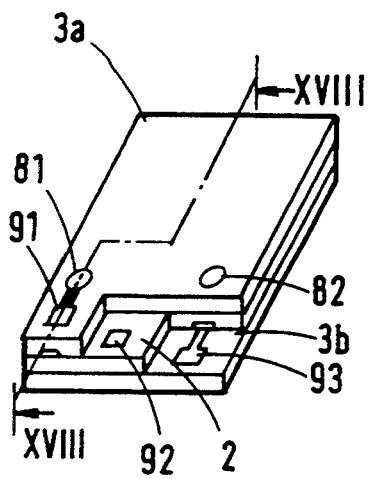
FIG. 17 shows a schematic perspective view of the sensor of FIG. 16.

FIG. 17 is a schematic perspective view of the acceleration sensor wherein the parts of FIGS. 16(a), (b), and (c) have been laminated and anodically joined.

In FIGS. 16(a) and 16(c), the fixed electrodes 8' and 9' are formed by sputtering or depositing a material With a high melting point, for example in excess of 1300° C., such as Al, Al-Si, Al-Pd, Cr, Mo, Ni, Ti, W, Pd, Pt, Au, Ag-Cu, Ag-Cd, Ag-W, Ag-CdO, other A alloys containing oxides, WC, Pd-Cu, Au-Cu, Au-Ni and AuCO precipitation hardened alloys, so that they can withstand the 300° to 400° C. required to form the anodic junction required to obtain the laminate structure shown in FIG. 17.

Because it has been found difficult to satisfactorily adhere hard material having a high melting point to the insulating substrates 3a, 3b, so it is preferred that the fixed electrodes 8' and 9' are each of a two-layer structure. The advantage of the two-layer structure is that a material with a strong adhesive strength with the substrates 3a and 3b can be selected as a first layer which may not be always a high melting point metal. For example, Al, Al-Si, Al-Pd, or Cr may be used as a first layer and Mo, Ni, W, Ti, Pd or Pt may be used as a second (outer) layer so as to thereby form fixed electrodes having a two-layer structure. When the first layer is thick, however, problems may be imposed on thermal strength. Experimental result shows that a thickness ranging from 0.01 μm to 0.1 μm is desirable. The second layer is required to be thicker than the first layer from the viewpoint of durability, and a thickness of 0.1 μm or more is desirable.

The insulating substrates 3a and 3b, have a thickness in the range from 0.2 mm to 1.5 mm in consideration of dielectric breakdown caused during anodic junction bonding the silicon substrate 1. Furthermore, the thickness of the upper and lower substrates affects the temperature characteristics of the sensor. When the substrates 3a and 3b are thermally deformed, the upper and lower gaps are changed and the electrostatic capacitance is also changed, causing a detection error. To minimize this thermal deformation, it is desirable to make the upper and lower substrates approximately the same in thickness as each other. Experimental result shows that a thickness ratio between the upper and lower (stationary) electrodes ranging from 0.5 to 2.0 (that is, 2 times or less) causes no great thermal deformation. It is desirable to make both substrates equal in thickness to about 0.5 mm.

Figure 18:
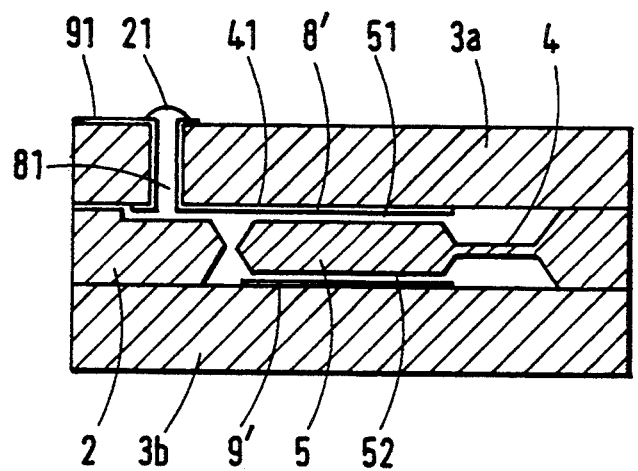
FIG. 18 shows a cross-sectional side view of the sensor along double arrow-headed lines XVIII—XVIII of FIG. 17.

FIG. 18 is a view along lines XVIII—XVIII of FIG. 17. To allow easy assembly, the wire 41 connected to the fixed electrode 8' is connected to the external connection bonding pad 91 via the through-hole 81. The wire 41 is formed by the same material used for the fixed electrode 8', such as Al or Mo, and insulated from the silicon substrate 1 by a microgroove. Silicone rubber 21 (or nylon resin or low melting point glass) is filled and hardened in the through-hole to prevent the movable electrode from hindrance by foreign substances, such as moisture or dust, introduced into the gaps 51 and 52 between the fixed electrodes and movable electrode and to simultaneously seal the foregoing microgroove.

Furthermore, in FIG. 18, the thickness of the cantilever relative to inertia body of the movable electrode 5 greatly affects the shock resistance thereof. In this regard, when handling the silicon substrate 2 which forms the movable electrode 5 and the cantilever 4 by anisotropic etching, the cantilever may be broken during cleaning of the etching solution. Therefore, the relationship between the ratio of the weight of the movable electrode to that of the cantilever supporting it and the shock resistance or the detection accuracy has been examined.

The examination result shows that a weight ratio of 100 to 250:1 between the movable electrode and the cantilever provides a good shock resistance with little effect on the detection accuracy. Assuming that the thickness of the inertia body formed by the movable electrode is 250 μm, the length is 1300 μm, and the width is 1500 μm, while the length of the cantilever is 900 μm and the width is 200 μm, the thickness of the cantilever ranges from 10 μm to 30 μm.

In FIG. 18, the dimentional accuracy of the gaps 51 and 52 directly affects the measurement accuracy. Therefore, it is important to control the etching depth of the movable electrode 5 of the silicon substrate 2 for forming the gaps and the film thickness of the fixed electrodes. The movable electrode is formed in an alkaline solution such as KOH by anisotropic etching. The etching depth is controlled by temperature and time, and the accuracy is about ±0.3 μm. The fixed electrodes are formed by sputtering or deposition, and the film thickness is controlled to about ±10%. Assuming, therefore, that the total film thickness of the fixed electrodes is 1 μm, the error is ±0.1 μm and variations in the gap width are ±0.4 μm. Furthermore, it is difficult to control the gap width to 2 μm or less at an appropriate yield rate for production in consideration of an effect of the thermal deformation of the substrates 3a and 3b. For the above reason, the width of the gaps 51 and 52 is, preferably, a median of 3 μm±1 μm.

Although the second aspect of the invention has been described with the fixed electrodes having a high melting point material as an outer surface, such material may also, or alternatively, be applied to the movable electrode for preventing fusion.

The second aspect of the present invention has the following advantages:

1. The two-layer structure of the electrodes using a metal with a high adhesive strength contacting the substrate and a metal with a high melting point coating improves reliability.

2. A thickness ratio of 2 or less between the upper and lower substrates allows effects on the temperature characteristics to be ignored.

3. A glass substrate thickness of 0.2 mm to 1.5 mm prevents glass dielectric breakdown during anodic junction forming, maintains reliability in forming a lead electrode on the inner wall of each through-hole, and improves the cutting and processing properties by a dicer.

4. A weight ratio of 100 to 250:1 between the movable electrode and the cantilever improves the handling properties of the sensor during processing and assembly and also shock resistance during use.

A second feature of the invention will now be described. Although the feature to be disclosed herein is applicable to the sensor of either the first or the second aspect, it is to be understood that the feature is also applicable to semiconductor acceleration sensors of the type having a movable electrode interspaced between a pair of opposed fixed electrodes and in which movement of the movable electrode relative to the fixed electrodes changes capacitance between the movable electrode and respective fixed electrodes, i.e. electrostatic capacitances C1 and C2 referred to above.

Figure 19:
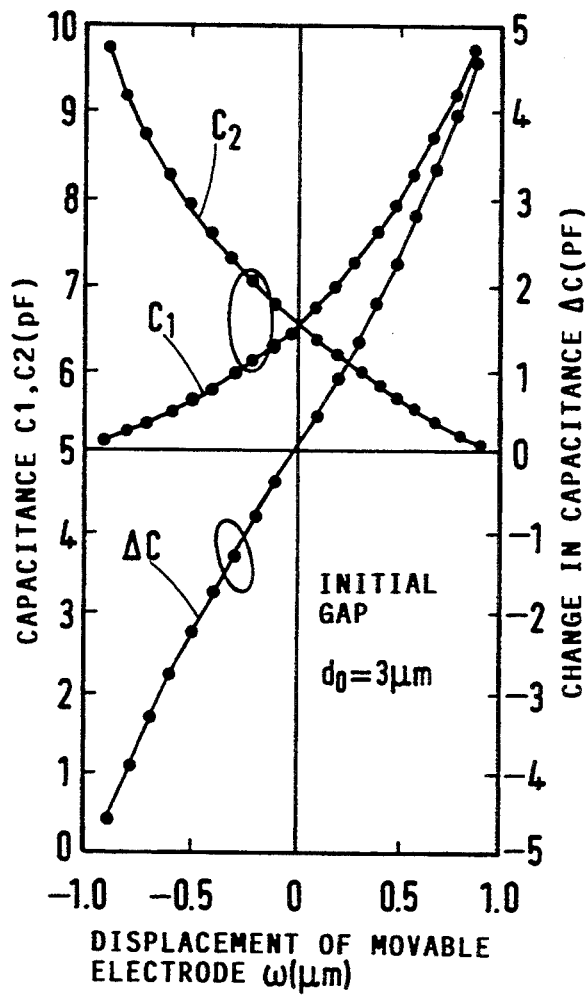
FIG. 19 shows a chart of the relationship between the displacement of a movable electrode and electrostatic capacitance.

The chart of FIG. 19 shows the relationship between the electrostatic capacitances C1 and C2 and the difference ΔC between C1 and C2 and the displacement of the movable electrode 5. The transverse axis indicates a displacement ω (μm) of the movable electrode 5. Assuming that the displacement at the neutral point holding the initial gap $d_o$ at 3 μm is 0, a positive displacement indicates that the movable electrode 5 moves upward (toward the fixed electrode 8 or 8') and a negative displacement indicates that the movable electrode 5 moves downward (toward the fixed electrode 9 or 9'). The chart shows that as the movable electrode 5 moves toward the fixed electrode 8 or 8', the electrostatic capacitance C1 increases, while as the movable electrode 5 moves toward the fixed electrode 9 or 9', the electrostatic capacitance C2 increases. The difference ΔC between the electrostatic capacitances C1 and C2 also increases in the positive or negative direction on the assumption that the displacement at the neutral point (reference point) is 0. When the movable electrode 5 is at the neutral point, the electrostatic capacitances C1 and C2 are the same (about 6.5 pF). Therefore, the displacement of the movable electrode 5 can be seen by detecting one of C1, C2, and ΔC. The difference ΔC is detected at the capacitance detector 101 shown in FIG. 20.

The movable electrode 5 detects, for example, an acceleration ranging from 0 to ±1 G at 0 to 10 Hz. Under the above conditions, the movable electrode moves extremely slightly and deforms within a micro range of ±30 fF (femto farad) round the reference point 0. Therefore, linear change signals using characteristics of each of C1, C2, and ΔC can be obtained.

In FIG. 20, the part enclosed by a broken line is an integrated circuit (IC) 2040 forming the detector unit 10. The IC 2040 is an integrated circuit of a mixture (Bi-CMOS device) of a bipolar device which is superior in high speed digital or analog processing or high current drive and of a CMOS device which is superior in digital processing and provides low power consumption and high integration. The IC 2040 is driven by a drive voltage VDD which is a constant voltage of 8 V in this embodiment. The drive voltage VDD is used as a supply Voltage for the operation amplifiers and logic circuit shown in FIG. 20. A reference voltage source 2041 generates various reference voltages R1, VB1, VB2, VH, and VL which are used inside the IC 2040.

The capacitance detector 101 detects the difference ΔC and converts the change in capacitance to a voltage representative thereof. The output from the detector 101 is amplified by the amplifier 102 under phase compensation and provided to the pulse width modulator 103.

The pulse width modulator 103 outputs a square wave voltage, the pulse width of which is changed according to the output of the amplifier 102, in a pulse train state. The output of the pulse width modulator 103 is controlled by a gate unit 2042 so that the peak value of the square wave voltage is set to a predetermined value (VR1). The output of the pulse width modulator 103 is applied to the sensor fixed electrode 8 by the inverter 104 via a signal line V1, and to the fixed electrode 9 via a signal line V2. The potential charge on the movable electrode 5 is set so that it is the peak value VR1.

Electrostatic force is generated in each of the fixed electrodes 8 and 9 by these applied voltages. Each electrostatic force functions as an attractive force for the movable electrode 5. The electrostatic force of the fixed electrode 8(8') moves the movable electrode 5 upward in FIG. 1 (FIG. 15) (this electrostatic force is assumed as an electrostatic force F1 in the positive direction) and the electrostatic force of the fixed electrode 9(9') moves the movable electrode 5 downward in FIG. 1 (FIG. 15) (this electrostatic force is assumed as an electrostatic force F2 in the negative direction). Therefore, the total electrostatic force Fo acting on the movable electrode 5 is expressed by the sum of the electrostatic forces F1 and F2 [Fo=F1+(−F2)]. In other words, when the electrostatic forces F1=F2 at no acceleration, the movable electrode 2 is held at the neutral point. When the electrostatic force F1>F2, a force moving the movable electrode 5 upward is applied to the movable electrode 5. When the electrostatic force F1<F2, a force moving the movable electrode 5 downward is applied to the movable electrode 5.

FIGS. 21(a) and (b), respectively, show the pulse width modulation (duty cycle control) of a square wave voltage applied to the fixed electrode 8 and the turnover voltage applied to the fixed electrode 9. FIG. 22 shows the electrostatic forces F1 and F2 acting on the movable electrode 5 from the fixed electrodes 8 and 9 and the sum of the forces (electrostatic force Fo). When the duties [D (pulse width)/T (period)] are continuously changed, the electrostatic forces F1 and F2 and the total electrostatic force Fo can be linearly changed.

When D/T=0 in FIG. 22, for example, the voltage applied to the fixed electrode 8 is almost 0, and the turnover voltage Vt applied to the fixed electrode 9 is maximum. Therefore, the electrostatic force F1 is 0, the electrostatic force F2 is maximum, and the total electrostatic force Fo is maximum in the negative direction. When D/T=1, the relation is the reverse to that when D/T=0. When D/T=0.5, the electrostatic force F1 is equal to the electrostatic force F2, the total electrostatic force Fo is 0, and the movable electrode 5 is restricted to the neutral point (initial position) when no acceleration is provided. When D/T=0.25, the pulse width ratio per period between the square wave voltages applied to the fixed electrodes 8 and 9 is 1:3, the ratio of the electrostatic force F1 to F2 also becomes 1:3 in proportion thereto, and the difference acts on the movable electrode 5 as an electrostatic force Fo in the negative direction. In this manner, the electrostatic force Fo changes linearly in the positive or negative direction depending on D/T under the condition that the position when D/T=0.5 is a zero cross point.

In this embodiment, on the basis of the output Vo of the difference ΔC between the electrostatic capacities C1 and C2 when the movable electrode 5 tends to move under external acceleration (the moving direction of the movable electrode 5 is opposite to the acceleration direction), the duty D/T is controlled (the pulse width is modulated) until the difference ΔC is reduced to zero by the pulse width modulator 103. When a maximum acceleration is generated, for example, in the positive direction (the maximum value within the measurement range) and the movable electrode 5 moves furthest in the opposite direction (on the fixed electrode 9 side), the pulse width is modulated so that D/T becomes the maximum value within the set range on the basis of the maximum −ΔC output. In this case, the electrostatic force Fo becomes maximum in the positive direction and set off against the acceleration displacement force (reaction force) in the negative direction which acts on the movable electrode 5, and the movable electrode 5 is returned to the neutral point (where the difference ΔC is zero) by electrostatic servocontrol.

When a maximum acceleration is generated reversely in the negative direction and the movable electrode 5 moves furthest in the opposite direction (on the fixed electrode 8 side), the pulse width is modulated so that D/T becomes the minimum value within the set range on the basis of the maximum ΔC output. In this case, the electrostatic force Fo becomes maximum in the negative direction and set off against the acceleration displacement force (reaction force) in the positive direction which acts on the movable electrode 5, and the movable electrode 5 is returned to the neutral point in the same manner as above.

In this manner, the duty D/T is always controlled according to the change and direction of the movable electrode 5 so that the difference ΔC becomes zero.

By integrating the pulse width modulation voltage VPWM, which is subjected to D/T control, by an integrator 2009, a linear output voltage (mean value) Vout' curve in proportion to the acceleration (G) can be obtained (as shown in FIG. 23). The sensitivity or zero point of the Vout' or VPWM value varies within a certain range depending on various factors when the acceleration sensor 1 or IC2040 is manufactured. The sensitivity and zero point are adjusted by an output adjustment unit 2060. In this embodiment, the acceleration detection range is between 0 and ±1 G, where G=9.8 m/s². FIG. 23 shows that when the acceleration is maximum (+1 G) in the positive direction, the duty D/T is maximum and the output Vout becomes maximum. When the acceleration is maximum (−1 G) in the negative direction, the duty D/T is minimum and the output Vout becomes minimum. When the acceleration is zero, the duty D/T is 0.5 and the output Vout takes a value at the intermediate point, and a linear Vout characteristic curve connecting these points can be obtained in the acceleration range between 0 and ±1.0 G.

The output V2 of the pulse width modulator 103 and the output V1 of the inverter 104 are as shown in FIGS. 21(a) and (b) respectively, the width of the pulse output of the pulse width modulator increasing with increasing acceleration.

A contact "a" at the junction of C1 and C2 is connected to the negative terminal of an operation amplifier 2011. Between the negative terminal and the output terminal, a capacitor 2020 with a capacitance of Cf and a switch 2012, which comprises a P-channel MOS in this embodiment, are connected in parallel. The positive terminal of the operation amplifier 2011 is connected to VR1 (VR1 is 5.8 V) and the negative terminal is set at the potential the same as that of the positive terminal. By so doing, the potential of the movable electrode 5 is kept at VR1. The output terminal of the operation amplifier 2011 is connected to a sample hold circuit 2013.

The operation of the capacitance detector unit 101 will now be described with reference to the operational waveforms shown in FIGS. 24(a) to (e).

The switch 2012 is normally kept ON so as to discharge the capacitor 2020 having capacitance Cf and set the output Vc of the operation amplifier 2011 to VR1. The switch 2012 is turned OFF in synchronization with the rising of the square wave voltage V1 whose pulse width is modulated and the falling of the voltage V2 (φR). If this occurs, C1 is charged and C2 is discharged. In this case, the charge Q1, which moves from C1 to Cf, (the charge appears to move due to a current flowing during discharge) and the charge C2, which moves from C2 to CS, are expressed by the following expressions:

$$Q1 = C1 VR1 \quad (3)$$

$$Q2 = -C2 VR1 \quad (4)$$

where VR1 is the value of the square wave voltage V1 or V2 whose pulse width is modulated.

Since the charge Qf accumulated in the capacitance Cf is the sum of Q1 and Q2, it is expressed by the following expression:

$$Qf = Q1 + Q2 = (C1 - C2) VR1 \tag{5}$$

The voltage V at both ends of the capacitance Cf is expressed by the following expression:

$$V = \frac{Qf}{Cf} = (C1 - C2)\frac{VR1}{Cf} \tag{6}$$

Since the output Vc of the operational amplifier 2011 is opposite in sign to the voltage V at both ends of the capacitance Cf, Vc is expressed by the following expression:

$$Vc = -(C1 - C2)\frac{VR1}{Cf} \tag{7}$$

By keeping a switch 2043 (a P-channel MOS switch in this embodiment) of the sample hold circuit 2013 ON for a predetermined time ($\phi_s$) so as to charge a capacitor 2044 with a capacity of Cs and sampling the output Vc of the operation amplifier 2011, the difference ΔC between C1 and C2 can be detected as a voltage converted value which is obtained by multiplying it by VR1. In this manner, the sample hold circuit 2013 samples the output of the operation amplifier 2011 and outputs the voltage Vs corresponding to ΔC. This output Vs is the output of the capacitance detector unit 101.

By using the capacitance detector unit 101 having this configuration, the difference ΔC between the electrostatic capacitances C1 and C2 representative of the displacement of the movable electrode 5 caused by acceleration can be detected as a voltage level using the pulse voltages V1 and V2 used for position control (electrostatic servo control) of the movable electrode 5.

The output Vs is amplified by the amplifier 102 and supplied to the pulse width modulator 103 as an amplified output Vin (amplified 50 times in this embodiment). The positive input terminal of an operational amplifier 2045 for amplification is connected to VR1.

The operation of the pulse width modulator 103 and a delay circuit 2046 having a variable means will now be described with reference to the waveforms (a) to (g) in FIG. 25.

In FIG. 20 a generator 2047 has a variable means which operates in a flip-flop circuit 2048. The waveform shown in FIG. 25(a) at the point "b" is a triangular waveform which has a predetermined period of T due to VH and VL (VH is 6 V and VL is 3 V in this embodiment), and the switching action of a NMOS switch 2049 and a capacitor 2050. By changing the current ratio between the current sources A1 and A2, the slope of the leading or trailing edge of the triangular waveform can be changed (the current ratio between A1 and A2 is 1:50 in this embodiment).

The output "c" of the flip-flop circuit 2048 is supplied to the delay circuit and the output "d" is reversed and supplied to an AND circuit 2051. When the triangular wave at the point "b" is supplied to the positive input terminal of a comparator 2052 and the foregoing amplification output Vin is supplied to the negative input terminal, waveform "e" is obtained as an output of the comparator. When waveform "e" is reversed and supplied to the AND circuit 2051, waveform "f" is obtained as an output of the AND circuit 2051. Furthermore, by the delay circuit 2046 having a variable means, a waveform "g" which is kept ON for a predetermined time of Th from the change of "c" or "f" can be obtained. The waveforms "g" and "f" are supplied to a NOR circuit 2053 and waveform "h" is obtained as an output. In this embodiment, the foregoing predetermined period T and time Th have a variable means and are configured so that variations in the individual circuit characteristics can be adjusted. The waveform "g" becomes the waveform $\phi_S$ via a second inverter 2054, and the waveform "g" becomes a waveform $\phi_R$ via a third and a fourth inverter 2055 and 2056. The waveform "h" becomes V1 via the inverter 104, a buffer unit 2057, and the gate unit 2042. V2 and VPWM (pulse width modulation voltage) are produced via the buffer unit 2057 and the gate unit 2042. When the voltage VPWM is integrated by the integrator 2009 (the low pass filter 105 with a RC circuit of a resistor R and a capacitor C connected in two stages), an output voltage Vout' in proportion to the acceleration is obtained. Furthermore, from the RC value, a predetermined cut-off frequency which is an output characteristic is obtained. The capacitor may be formed within the IC2040 or outside the IC2040. When the capacitor is formed within the IC2040, however, the IC increases in size (the IC size depends on the capacitance of the capacitor C).

The output adjustment unit 2060, which may be part of amplifier 106, will now be described with reference to FIGS. 20 and 26 to 28. The final output voltage Vout is expressed by equation (10)

$$VM = VB3 + \frac{R2}{R1}(VB3 - VPWM) \tag{8}$$

$$VOUT = VB2 + \frac{Rf}{Rs}(VB2 - VM) \tag{9}$$

$$VOUT = \frac{Rf\,R2}{Rs\,R1} VPWM + \tag{10}$$
$$\left[\left(1 + \frac{Rf}{Rs}\right)VB2 - \left(1 + \frac{R2}{R1}\right)\frac{Rf}{Rs} VB3\right]$$

Assuming that R1 and R2 are fixed resistances and VB2 is a constant voltage, the sensitivity is determined by Rf/Rs and the zero point is determined by Rf/Rs and VB3. Therefore, by adjusting the sensitivity (Rf/Rs) before the zero point, the zero point can be adjusted without affecting the sensitivity, providing a comparatively simple adjustment method. Accordingly, by making Rf/Rs and VB3 variable, the output voltage Vout can be adjusted to a predetermined value.

Detector unit sensitivity adjustment will now be described. In this embodiment, N-channel NMOS switches S1 to S7 and resistors Ra to Ri are interconnected. A predetermined constant voltage VB2 is connected to the positive input terminal of an operational amplifier 2065. By turning the switches S1 to S7 ON or OFF digitally, the resistors Rs and Rf for adjusting the sensitivity can be combined in $2^7$ ways (128 combinations). In this embodiment, although a 7-bit adjustment resolution is available, by increasing the number of bits (increasing the number of resistors and switches), the resolution can be enhanced. When the switches S1 to S4 are turned OFF and S5 to S7 are turned ON, a predetermined characteristic (initial characteristic) can be obtained by the resistors Re and Rj. Furthermore, by installing adjustment pads (B1 to B7) in the IC2040 and supplying a signal for turning the switches S1 to S7 ON or OFF from the pads so as to execute all 128 combinations, the sensitivity characteristics can be predefined.

A first switch control means 2062 for trimming ON or OFF the switches S1 to S7 on-chip will be described hereunder with reference to FIG. 26. A Zener diode ZD is connected to the B1 terminal, and RY and RZ are connected to VDD. RX indicates a base resistor of a transistor Tr and RZ an emitter resistor. The transistor Tr is of the PNP type, and an inverting buffer 2063 is connected to the emitter. A voltage higher than the Zener voltage is applied between the B1 terminal and the ground via a prober so as to destroy the diffusion (n+, p+) of the Zener diode ZD. Then, the B1 terminal is short-circuited to the ground. If this occurs, the transistor Tr is turned ON, the emitter is grounded, the output D1 of the inverting buffer 2063 goes high, and the switch S1 connected to D1 is turned ON. B2 to B7 and D2 to D7 are configured in the same manner.

Figure 27:
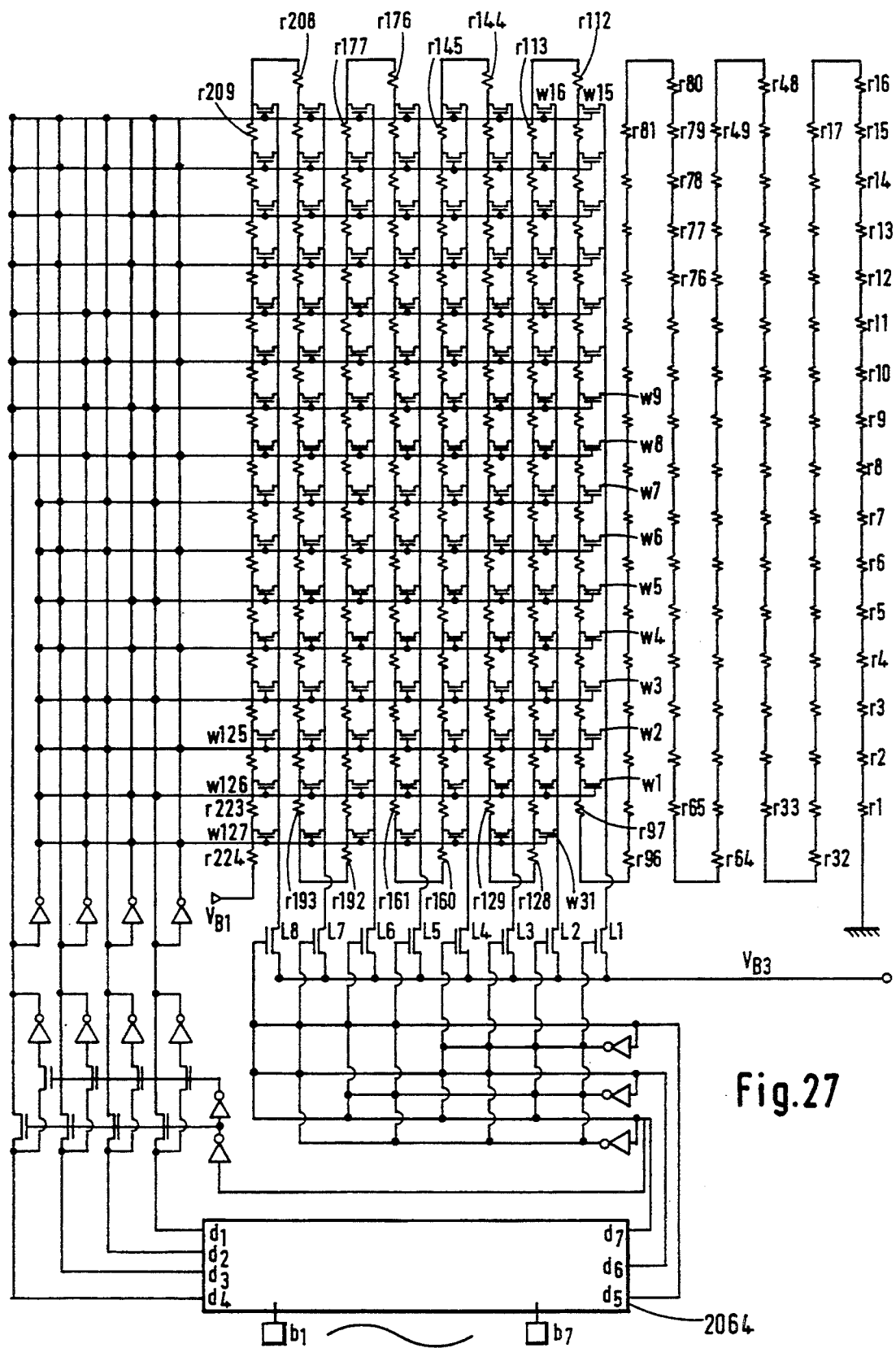
FIGS. 27 and 28 are circuit diagrams of a zero point adjustment unit.
Figure 28:
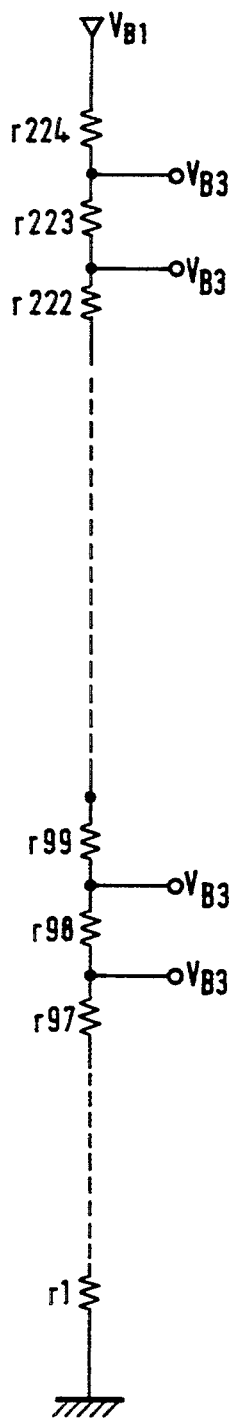

A zero adjustment unit 2061 will now be described with reference to FIGS. 27 and 28 which show an enlargement of the zero adjustment unit 2061, shown in FIG. 20. N-channel NMOS switches W1 to W127 and L1 to L8 and resistors r1 to r224 are connected in a rectangular matrix. $V_{B1}$ is a reference voltage (for example 3.5V), and $V_{B3}$ is an output of the resistor (r1 to r224) voltage division circuit. When all the terminals d1 to d7 are grounded (0 V), $V_{B3}$ is floating. When only the terminal d1 is made high and the other terminals d2 to d7 are grounded, the switches W1 and L1 are selected (turned ON) and the output $V_{B3}$ is expresed by $V_{B3} = r97/r224 V_{B1}$. The relation between the terminals b1 to b7 and the output $V_{B3}$ is as shown in Table 1. $V_{B3}$ can output $2^7$ (128) divided voltages of $V_{B1}$ as shown in Table 1.

TABLE 1

| b7 | b6 | b5 | b4 | b3 | b2 | b1 | $V_{B3}$ |
|---|---|---|---|---|---|---|---|
| 1 | 1 | 1 | 1 | 1 | 1 | 1 | $\frac{r223}{r224} \times V_{B1}$ |
| 1 | 1 | 1 | 1 | 1 | 1 | 0 | $\frac{r222}{r224} \times V_{B1}$ |
| . | | | | | | | |
| . | | | | | | | |
| 0 | 0 | 0 | 0 | 0 | 1 | 0 | $\frac{r98}{r224} \times V_{B1}$ |
| 0 | 0 | 0 | 0 | 0 | 0 | 1 | $\frac{r97}{r224} \times V_{B1}$ |
| 0 | 0 | 0 | 0 | 0 | 0 | 0 | $V_{B3}$ is open |

In this embodiment, a 7-bit adjustment resolution is available. A series of operations can digitally control $V_{B3}$ in a similar fashion to the way in which sensitivity was adjusted. The operation of a second switch control means is the same as that of the first switch control means 2062.

Figure 29:
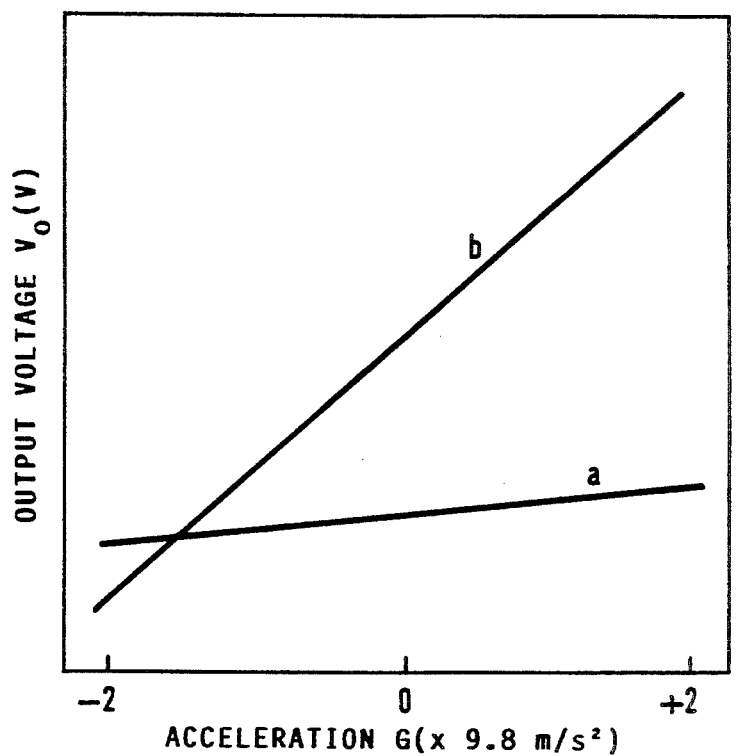
FIG. 29 shows a wiring diagram of an output voltage adjustment circuit.
Figure 30:
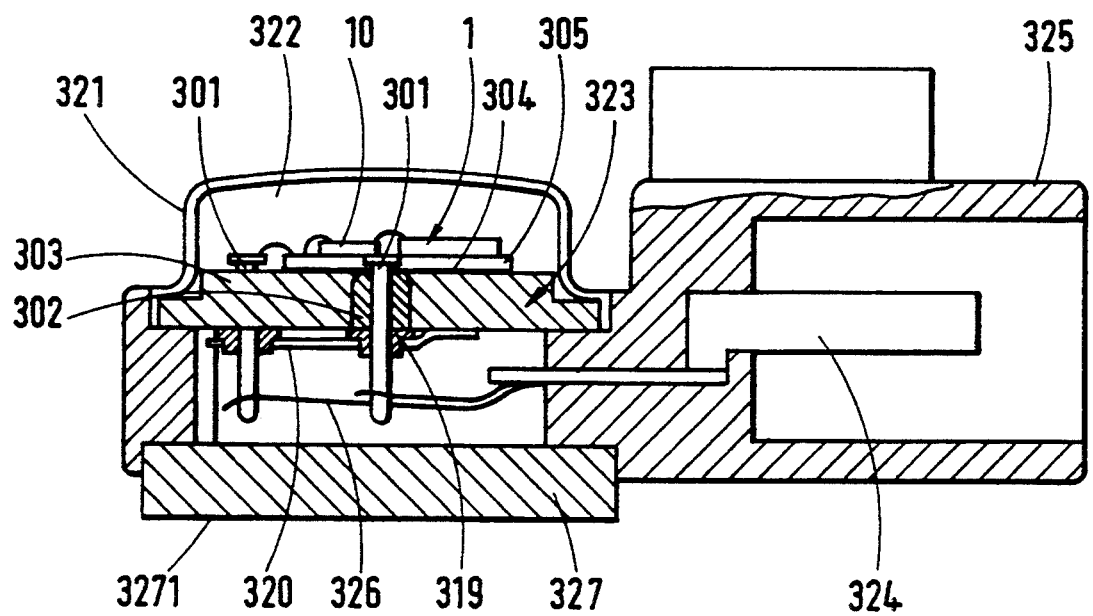
FIG. 30 shows a cross-sectional side view of one embodiment of a semiconductor acceleration sensor in accordance with the third feature of this invention.
Figure 31:
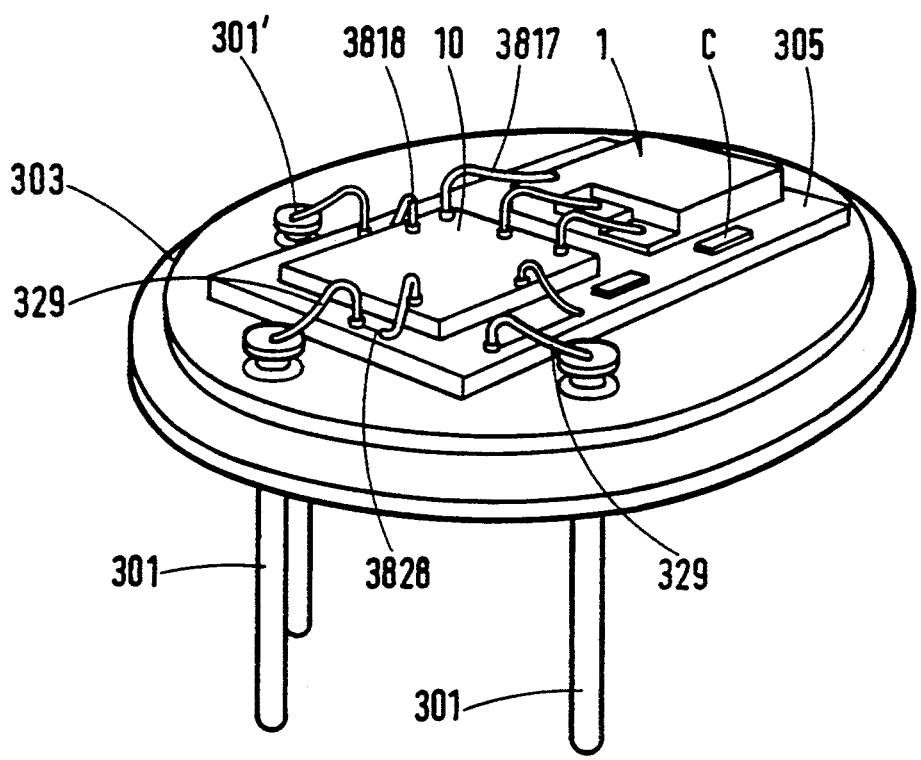
FIG. 31 shows a perspective view of the inside of the acceleration sensor shown in FIG. 30 with the cap removed.

Thus, the zero adjustment unit 2061 is for moving the characteristic curve "a" shown in FIG. 29 along the x (horizontal) axis and sensitivity (span) adjustment using switches S1 to S7 is for changing the gradient of the characteristic curve "a" so that the curve "a" may be transformed to curve "b".

The second feature of the present invention is effective in providing a sensor lower in price with a compact detector circuit (resulting in a compact sensor) by using an acceleration detection processing circuit including an output adjustment circuit for adjusting the sensitivity and zero point which comprises a one-chip IC as signal processing for the acceleration sensor assembly.

By providing a sensor detector unit in which the sensitivity and zero point may be digitally adjusted by using a combination of resistors and switches, characteristics of the sensitivity and zero point can be predetermined and variations in the resistance or in the operational amplifier or reference voltage circuit can be absorbed, providing highly accurate sensitivity and zero point adjustment.

A third feature of the invention will now be described which relates to the provision of an acceleration sensor assembly, that is the sensor and the detector unit, in which the assembly is protected against changes in environmental conditions. Again, the assembly of the feature, although being described in relation to the embodiments of the first or second aspect of the invention, need not necessarily be so limited.

Figure 35:
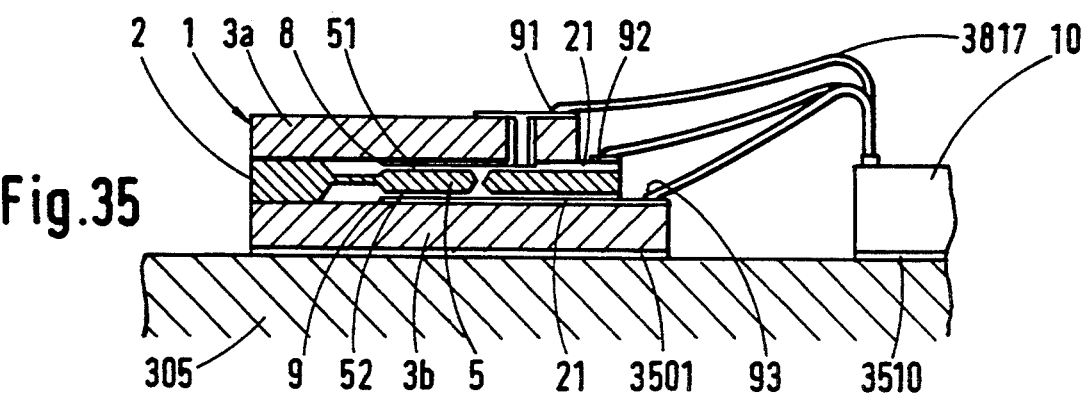
FIG. 35 shows a sectional side view of a sensor.
Figure 36:
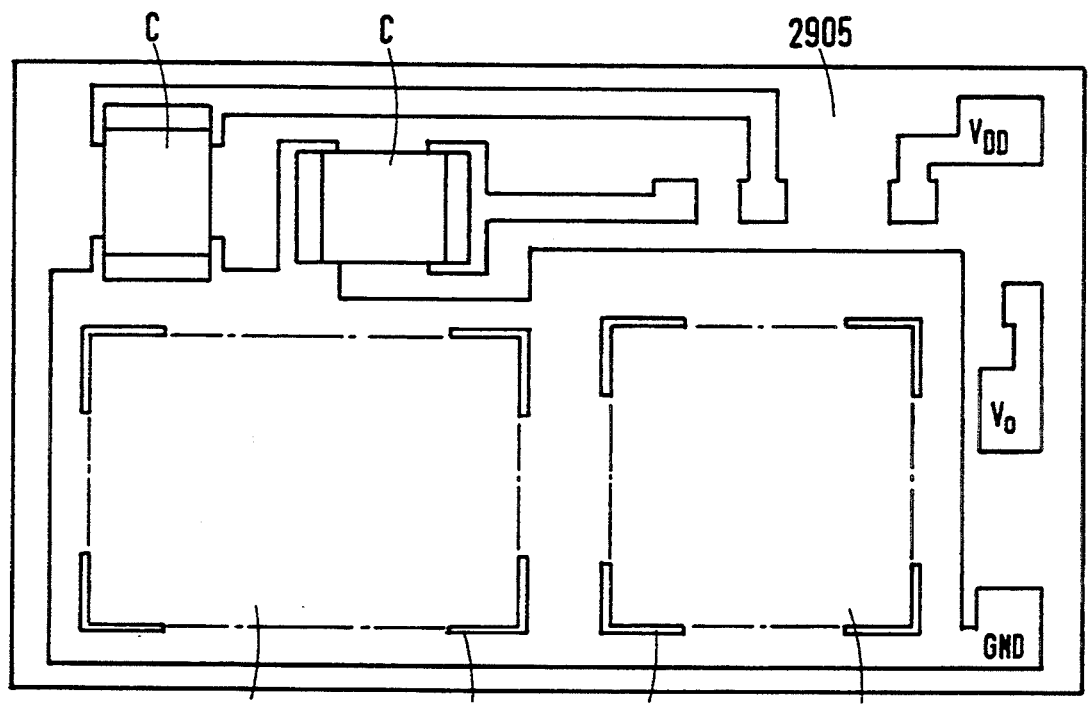
FIG. 36 shows a ground pattern layout of the circuit of FIG. 20 on an alumina substrate.

Referring to FIGS. 30 to 38, a thick film print alumina substrate 305 is mounted via a bonding layer 304 to a base 303 and a plurality of lead pins 301 which pass though the base are fixed to the base by a glass material 302. Prior to mounting the substrate 305, a ground pattern 306 (shown in FIG. 36) is formed on the alumina substrate 305 by thick film print where the detector unit 10 IC 2040 and the sensor 1 chip are to be secured. A plurality of blank areas 309, 210 are pre-formed in correspondence with, for example, the corner of each chip. Referring to FIG. 35 (which is a view in the opposite direction to the views of FIGS. 30–33), the detector unit 10 and sensor 1 are secured by respective bonding layers 3510 and 3501, and to improve accuracy by reducing stray capacitance, the distance between the detector unit 10 and sensor 1 is 1 mm or less. The bonding layer 3501 is made of silicone resin and the thickness thereof preferably ranges from 0.08 mm to 0.1 mm to reduce warp due to thermal expansion and shinkage. One of the lead pins 301' (shown in FIGS. 31 and 33) is directly brazed and fixed to the base to be used for grounding. Capacitors C (FIGS. 31, 36–38), resistors 3813 and 3814, trimming resistors 3815 and 3816, and a conductor 3828 (FIGS. 31, 38), which cannot be placed within the IC 2040, are formed on the alumina substrate 305. A conductor 3817 (FIG. 38) between the IC 2040 and the sensor 1 and a conductor 3818 between the IC 2040 and the alumina substrate 305 are bonded by ultrasonic heat bonding. An I/O signal is supplied via conductors 329 bonded to the head of the pins 301 on the base.

A though-type capacitor 319 is soldered into each lead pin 301 which protrudes from the lower side of the base 303 for preventing radiation of broad band noise from the lead pins. A ground plate 320 is fitted and soldered to the periphery of the through-type capacitors 319, and one end of the ground plate is soldered to the base 303 so as to minimise the effects of external radio waves and noise.

The base 303 has a recessed, radially protruding lip extending radially by 0.5 to 1.5 mm so as to form a location upon which an annular ring of a cap 321 is welded. The base and cap are made of iron with a surface plating of Ni. Inert gas 322 such as $N_2$ or Ar having a dew point below $-40°$ C. is charged into the cap before the cap ring is welded to the base.

The thus formed cap and base assembly 323 is bonded with adhesive to a face of the opening of a plastics housing 325 having an external lead pin 324 partially embedded in the housing. The exposed portion of the pin 324 is plated with gold. Each lead pin 301 of the cap and base assembly 323 is interconnected to a respective external lead pin 324 by a fine metallic conductor 326 by welding or bonding. The bonded wires may be embedded in silicone gelatin.

A base 327 is bonded to the lower opening of the housing 325, and the bottom surface 3271 of the base is the datum plane for mounting the acceleration sensor assembly.

Figure 32:
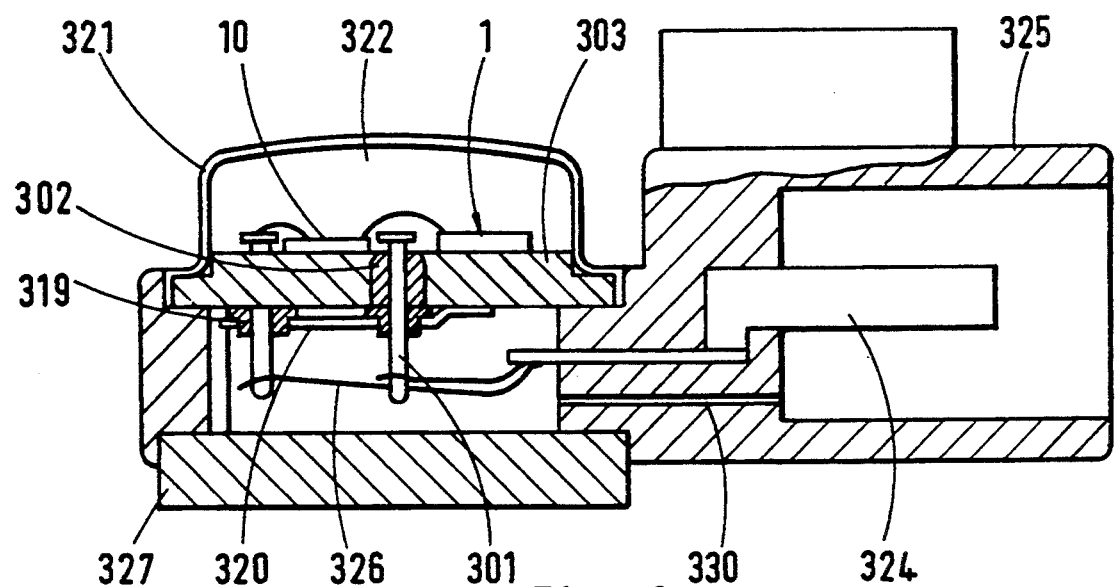
FIG. 32 shows a sectional side view of another embodiment of the acceleration sensor in accordance with the third feature of this invention.
Figure 33:
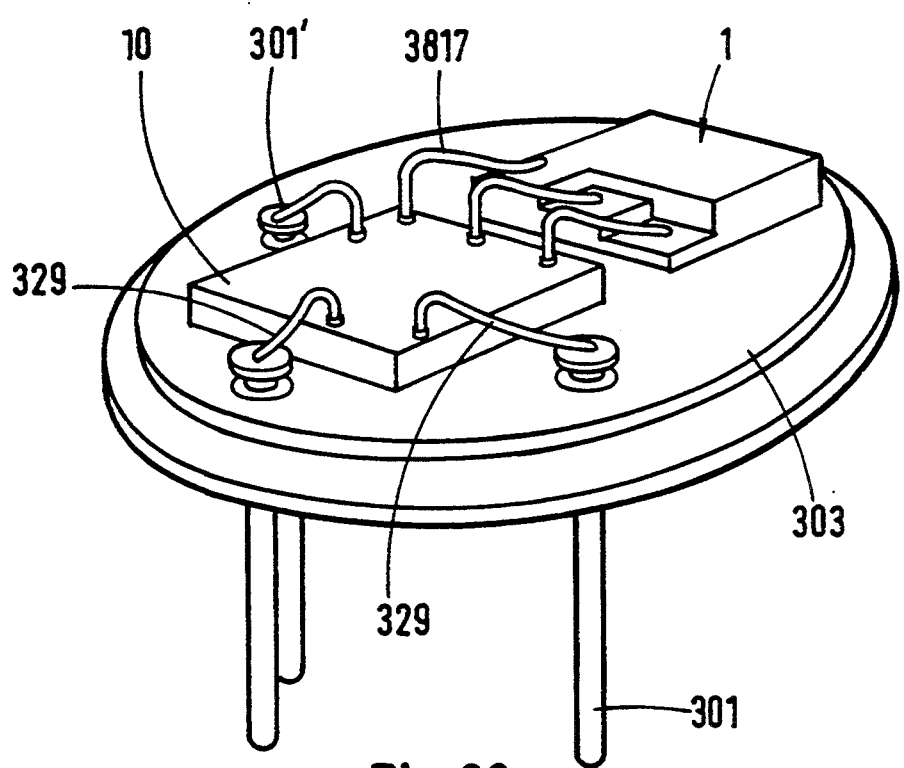
FIG. 33 shows a perspective view of the inside of the acceleration sensor shown in FIG. 32 with the cap removed.
Figure 34:
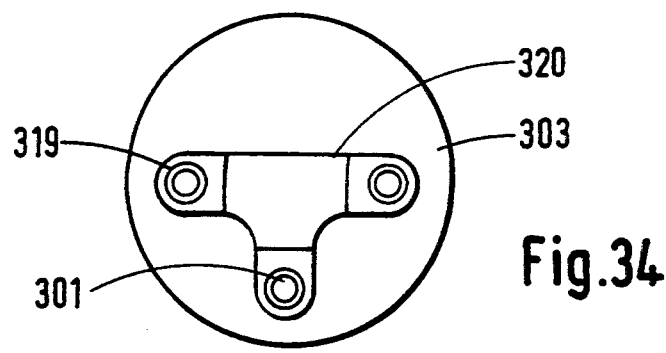
FIG. 34 shows a schematic view of the underside of the sensor shown in FIGS. 31 and 33.

The chamber in which the fine conductors 326 are located may be provided with fresh air through a hole 330 formed in the plastic housing 325, as shown in FIG. 32.

Figure 37:
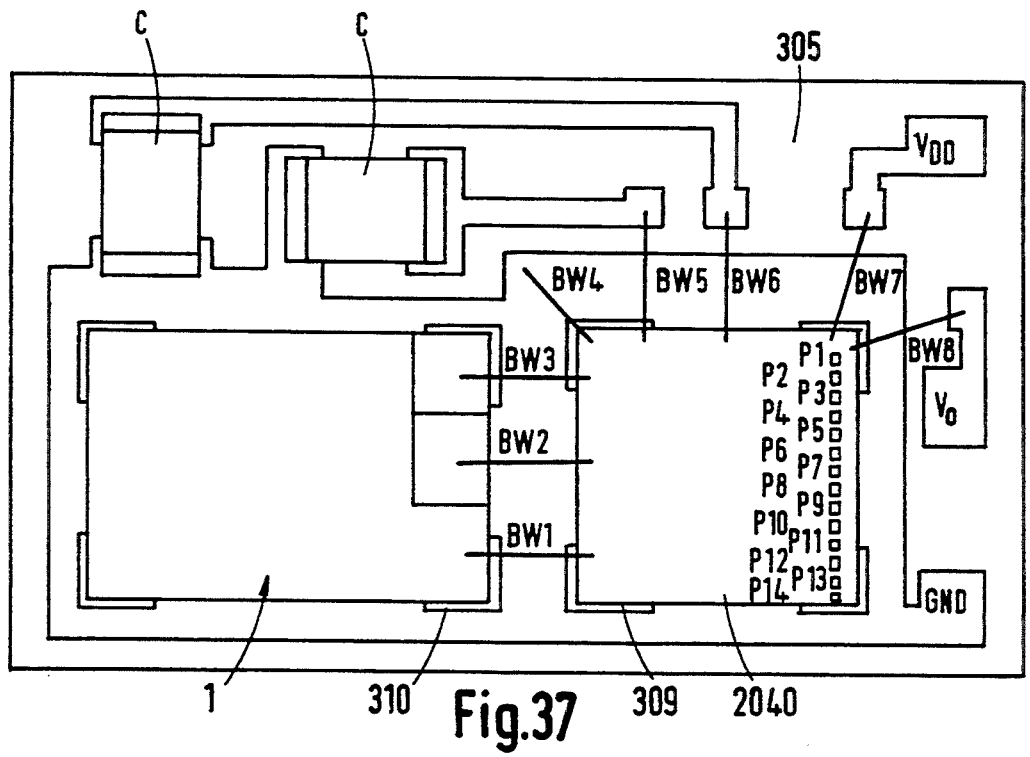
FIG. 37 shows an alumina substrate assembly.
Figure 38:
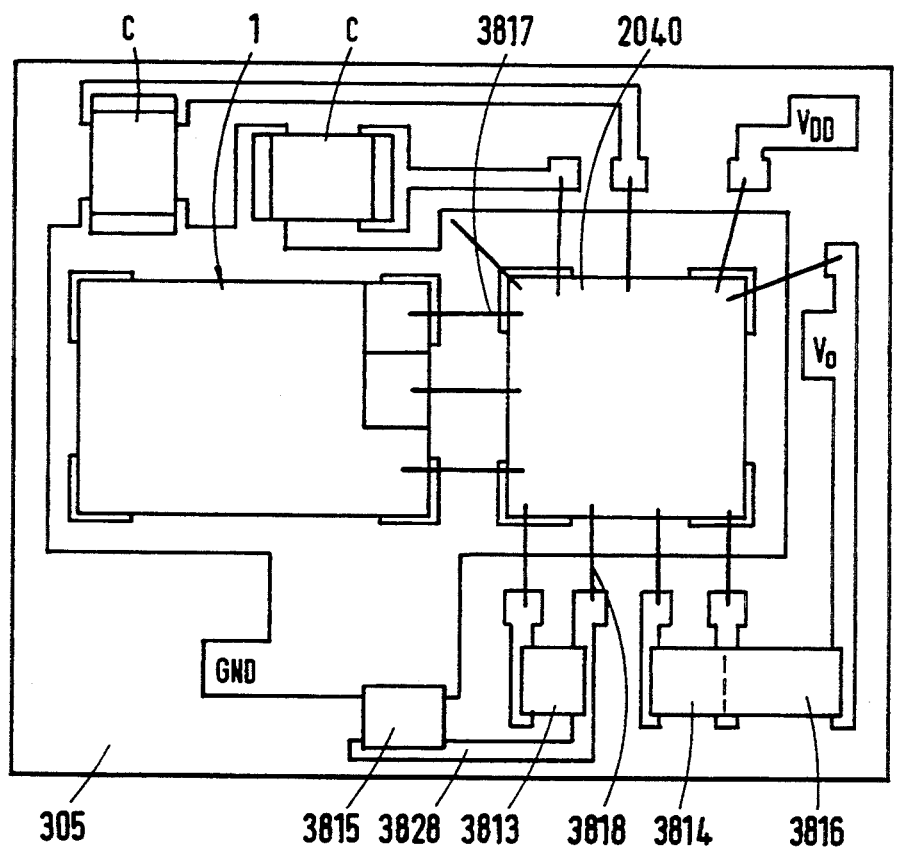
FIG. 38 shows another alumina substrate assembly.

When a large capacitor is required in the detector circuit, it is necessary to locate the capacitors C outside the IC 2040 and to put and wire the chips on the alumina substrate, as shown in FIG. 37, so as to miniaturize the sensor assembly. When the output voltage adjustment circuit is not contained in the IC2040, it is possible to form the external thick film resistor 3813 to 3816 on the alumina substrate as shown in FIG. 38 and to adjust the output voltage for the acceleration by trimming the resistors 3815, 3816 by a laser.

For output voltage adjustment of an automobile acceleration sensor, gravitational acceleration using the gravity of the earth is generally used. Since the linearity of the acceleration sensor is good, when the measured values at two points at a distance interval of more than a predetermined value are nearly equal to the target characteristic value, it may be considered that the adjustment is completed. Digital adjustment is performed as described above with reference to FIGS. 20 and 26-29.

The above described third feature of this invention has the following advantages:

1. Because the sensor and detector unit are contained in a hermetically sealed base and a chamber in the cap into which inert gas is charged, they are free of environmental effects, for example corrosion, and reliability is improved.

2. The dew point of the inert gas charged into the cap is −40° C. or lower, and there is, therefore, no possibility of dew condensation at the environmental temperature of an automobile or of corrosion due to moisture.

3. Because the acceleration sensor assembly comprises only two chips, that is the sensor and the detector unit, it can be made compact and dedicated.

4. The cap and base assembly can be commonly used, and parts are made lower in price. Since the cap and base assembly is installed in a plastic housing, it can be readily designed for a customers specific shape requirements.

5. The detector unit is formed by microprocessing semiconductor silicon resin and the sensor can be made compact. Since a semiconductor manufacturing process can be used, the sensor is lower in price.

6. Through-type capacitors incorporated in the lead pins minimize failures by external radio waves.

7. Since a ground pattern is placed overall under the sensor and detector unit, effects of external radio waves and noise can be minimized.

8. Since the detector unit fixing adhesive is made of silicon resin and the adhesive thickness is 0.1mm or less, the warp of the detector unit caused by changes in temperature is small and temperature dependent error is small.

9. Since the cap and base are plated with Ni, and the base has an annular ring on which the cap is located, sputtering during welding can be minimized.

10. The mounting structure of the acceleration sensor of the present invention realizes miniaturization, high accuracy, and high reliability.

It is to be understood that the invention has been described with reference to exemplary embodiments, and modifications may be made without departing from the spirit and scope of the invention as defined in the appended claims.

We claim:

1. A semiconductor acceleration sensor comprising a cantilever having a conductive, movable electrode of predetermined mass at one end thereof, said cantilever being made of a material of silicon type, at least one fixed conductive electrode which is stationary with respect to said movable electrode and located on a side of said movable electrode, said fixed electrode being separated from said movable electrode by a predetermined gap, and insulation means located between the movable electrode and the fixed electrode for preventing a short-circuit therebetween, wherein
    (a) said sensor is in combination with a detector unit therefor and said sensor and said detector unit are both located in a hermetically sealed chamber,
    (b) said detector unit being an integrated circuit and said sensor being an integrated chip device,
    (c) said integrated circuit and said chip device being both mounted on a base, and
    (d) a cap is hermetically sealed to said base.

2. A sensor as claimed in claim 1 wherein an inert gas having a dew point of −40° C. or less is charged into the hermetically sealed chamber.

3. A sensor as claimed in claim 1 wherein signals to and from the sensor and detector unit are supplied via lead pins which are hermetically sealed by glass in the base and said lead pins extend through said base into a sealed volume, said sealed volume being formed by a molding to which the hermetically sealed chamber is attached and a cover plate.

4. A sensor as claimed in claim 3 wherein output connectors are connected to said lead pins by metallic wires made from one of Ni, Al, or Au, and wherein said connectors provide external signals indicative of sensor output to control means.

5. A sensor as claimed in claim 3 wherein through-type capacitors are incorporated in said lead pins for reducing broad band noise from the lead wires.

6. A sensor as claimed in claim 1 wherein the detector unit integrated circuit is secured to the base via a bonding layer which is not more than 0.1 mm in thickness.

7. A sensor as claimed in claim 6 wherein said bonding layer is made of silicone resin.

8. A sensor as claimed in claim 1 wherein the integrated circuit and said chip device are mounted on a thick film alumina substrate adapted to provide a ground pattern whereby effect of external radio waves and noise is minimized.

9. A sensor as claimed in claim 1 wherein the distance between the integrated circuit and the chip device is not more than 1 mm.

10. A semiconductor acceleration sensor in combination with an acceleration detector unit, said sensor comprising a cantilever having a conductive, movable electrode of predetermined mass at one end thereof, said cantilever being made of a material of silicon type, at least one pair of fixed conductive electrodes which are stationary with respect to said movable electrode and located on opposing sides of said movable electrode, said fixed electrodes being separated from said movable electrode by a predetermined gap, and insulation means located between the movable electrode and the fixed electrode for preventing a short-circuit therebetween, said detector unit comprising a processing circuit for processing signals from the sensor wherein said processing circuit comprises a first capacitor and a first switching means as a feedback element of an operational amplifier, a negative input terminal of said operational amplifier being connected to said movable electrode and a positive input terminal of said operational amplifier being connected to a predetermined reference voltage, a sample hold circuit comprising a second switching means and a second capacitor for detecting electrostatic capacitance difference between the movable electrode and each of the fixed electrodes as a voltage at the terminal of the operational amplifier, an amplification means for amplifying the output of the second switching means and second capacitor, means for generating a waveform train with a period the pulse width of which is modulated by the amplified signal, means for supplying the voltage waveform train to each of the fixed electrodes, means for turning the said first and second switching means ON or OFF for a predetermined period of time in synchronization with the voltage waveform train, means for converting the voltage waveform train to an analogue voltage, and an output adjustment means for adjusting the analogue voltage to a predetermined characteristic, wherein the sensor and detector unit are both located in a hermetically sealed chamber, the detector unit being an integrated circuit and the sensor being an integrated chip device, said integrated circuit and said chip device being both mounted on a base, and a cap is hermetically sealed to said base.

11. A combination as claimed in claim 10 wherein said processing circuit is arranged such that when said first switching means is OFF the second switching means is ON.

12. A combination as claimed in claim 11 wherein said voltage waveform train is applied to one of said fixed electrodes and the waveform train which reverses the voltage waveform train is applied to the other fixed electrode.

13. A combination as claimed in claim 10 wherein said predetermined reference voltage is the same level as the peak value of said voltage waveform train.

14. A combination as claimed in claim 10 wherein said adjustment means includes at least a plurality of resistors and further switching means is provided for digitally combining said resistors in a desired combination to provide a required output characteristic.

15. A combination as claimed in claim 10 wherein an inert gas having a dew point of −40° C. or less is charged into the hermetically sealed chamber.

16. A combination as claimed in claim 10 wherein signals to and from the sensor and detector unit are supplied via lead pins which are hermetically sealed by glass in the base and said lead pins extend through said base into a sealed volume, said sealed volume being formed by a molding to which the hermetically sealed chamber is attached and a cover plate.

17. A combination as claimed in claim 16 wherein output connectors are connected to said lead pins by metallic wires made from one of Ni, Al, or Au, and wherein said connectors provide external signals indicative of sensor output to control means.

18. A combination as claimed in claim 17 wherein through-type capacitors are incorporated in said lead pins for reducing broad band noise from the lead wires.

19. A combination as claimed in claim 10 wherein the integrated circuit and said chip device are mounted on a thick film alumina substrate adapted to provide a ground pattern whereby effect of external radio waves and noise is minimized.

20. A combination as claimed in claim 10 wherein the detector unit integrated circuit is secured to the base via a bonding layer which is not more than 0.1 mm in thickness.

21. A combination as claimed in claim 20 wherein said bonding layer is made of silicone resin.

22. A combination as claimed in claim 10 wherein the distance between the integrated circuit and the chip device is not more than 1 mm.

23. A semiconductor acceleration sensor comprising:
a cantilever having a cantilever-movable silicon electrode of predetermined mass at one end thereof;
at least one fixed electrode which is stationary with respect to said movable electrode and located at a cantilever-movable side of said movable electrode, said fixed electrode being separated from said side of said movable electrode by a predetermined gap;
insulation means located directly on at least one of said movable and fixed electrodes at said gap for preventing a short circuit therebetween; and
damping means comprising an inert gas in said gap and said insulation means being in a defined pattern which does not cover the entire surface of said at least one of said movable and fixed electrodes for providing a roughened surface on said at least one of said movable and fixed electrodes, preventing said gas from freely moving over said roughened surface and damping cantilever movement of said movable electrode,
wherein said sensor is in combination with a detector unit therefor and said sensor and said detector unit are both located in a hermetically sealed chamber.

24. A semiconductor acceleration sensor comprising:
a cantilever having a cantilever-movable silicon electrode of predetermined mass at one end thereof;
at least one fixed electrode which is stationary with respect to said movable electrode and located at a cantilever-movable side of said movable electrode, said fixed electrode being separated from said side of said movable electrode by a predetermined gap;
insulation means located directly on at least one of said movable and fixed electrodes at said gap for preventing a short circuit therebetween; and
damping means comprising an inert gas in said gap and said insulation means being in a defined pattern which does not cover the entire surface of said at least one of said movable and fixed electrodes for providing a roughened surface on said at least one of said movable and fixed electrodes, preventing said gas from freely moving over said roughened surface and damping cantilever movement of said movable electrode,
wherein said sensor is in combination with a detector unit therefor and said sensor and said detector unit are both located in a hermetically sealed chamber, and wherein said inert gas has a dew point of −40° C. or less and said inert gas is charged into the hermetically sealed chamber.

25. A semiconductor acceleration sensor comprising a cantilever having a conductive, movable electrode of predetermined mass at one end thereof, said cantilever being made of a material of silicon type, at least one fixed conductive electrode which is stationary with respect to said movable electrode and located on a side of said movable electrode, said fixed electrode being separated from said movable electrode by a predetermined gap, and insulation means formed in a defined pattern on at least one of the movable electrode and the fixed electrode for preventing a short circuit therebetween, said insulation means providing a roughened surface on said at least one of said movable electrode and the fixed electrode, wherein (a) said sensor is in combination with a detector unit therefor and said sensor and said detector unit are both located in a hermetically sealed chamber,
(b) said detector unit is an integrated circuit and said sensor is an integrated chip device,
(c) said integrated circuit and said chip device are both mounted on a base,
(d) a cap is hermetically sealed to said base, and
(e) an inert gas is provided in said hermetically sealed chamber in said gap between the movable electrode and said at least one fixed electrode, whereby said insulation means in said defined pattern prevents said gas from freely moving over said roughened surface and damping of said movable electrode is produced.

26. A semiconductor acceleration sensor in combination with an acceleration detector unit, said sensor comprising a cantilever having a conductive, movable electrode of predetermined mass at one end thereof, said cantilever being made of a material of silicon-type, at least one pair of fixed conductive electrodes which are stationary with respect to said movable electrode and located on opposing sides of said movable electrode, said fixed electrodes being separated from said movable electrode by a predetermined gap, insulation means located directly on at least one of said movable electrode and the at least one pair of fixed conductive electrodes, said insulation means being shaped in a defined pattern which does not cover the entire surface of the electrode to which it is applied and said insulation means providing a roughened surface on said electrode to which it is applied, said detector unit comprising a processing circuit for processing signals from the sensor, wherein said processing circuit comprises a first capacitor and a first switching means as a feedback element of an operational amplifier, a negative input terminal of said operational amplifier being connected to said movable electrode and a positive input terminal of said operational amplifier being connected to a predetermined reference voltage, a sample hold circuit comprising a second switching means and a second capacitor for detecting electrostatic capacitance difference between the movable electrode and each of the fixed electrodes as a voltage at the output terminal of the operational amplifier, an amplification means for amplifying the output of the second switching means and second capacitor, means for generating a waveform train with a period the pulsewidth of which is modulated by the amplified signal, means for supplying the voltage waveform train to each of the fixed electrodes, means for turning the said first and second switching means ON or OFF for a predetermined period of time in synchronization with the voltage waveform train, means for converting the voltage waveform train to an analogue voltage, and an output adjustment means for adjusting the analogue voltage to a predetermined characteristic, wherein the sensor and detector unit are both located in a hermetically sealed chamber, the detector unit being an integrated circuit and the sensor being an integrated chip device, said integrated circuit and said chip device being both mounted on a base, a cap hermetically sealed to said base, and an inert gas in said predetermined gap between the movable electrode and said fixed electrodes, whereby said insulation means in said defined pattern prevents said gas from freely moving over said roughened surface and damping of said movable electrode is produced.

* * * * *